(12) United States Patent
Hayashi et al.

(10) Patent No.: US 9,166,516 B2
(45) Date of Patent: Oct. 20, 2015

(54) MOTOR DRIVE APPARATUS AND VEHICLE INCLUDING THE SAME, AND METHOD FOR CONTROLLING MOTOR DRIVE APPARATUS

(75) Inventors: Kazuhito Hayashi, Inazawa (JP); Hideto Hanada, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 26 days.

(21) Appl. No.: 14/129,722

(22) PCT Filed: Jun. 30, 2011

(86) PCT No.: PCT/JP2011/065010
§ 371 (c)(1),
(2), (4) Date: Dec. 27, 2013

(87) PCT Pub. No.: WO2013/001634
PCT Pub. Date: Jan. 3, 2013

(65) Prior Publication Data
US 2014/0139156 A1    May 22, 2014

(51) Int. Cl.
| | |
|---|---|
| *H02P 27/06* | (2006.01) |
| *H02P 21/02* | (2006.01) |
| *H02P 23/02* | (2006.01) |
| *B60L 15/20* | (2006.01) |
| *H02P 6/04* | (2006.01) |

(52) U.S. Cl.
CPC ............. *H02P 27/06* (2013.01); *B60L 15/2045* (2013.01); *H02P 6/04* (2013.01); *H02P 21/02* (2013.01); *H02P 23/02* (2013.01); *B60L 2210/14* (2013.01); *B60L 2240/427* (2013.01); *B60L 2240/527* (2013.01); *B60L 2260/44* (2013.01); *Y02T 10/643* (2013.01); *Y02T 10/644* (2013.01); *Y02T 10/7225* (2013.01); *Y02T 10/7283* (2013.01)

(58) Field of Classification Search
CPC ........................................................ H02P 27/06
USPC .................................. 318/400.3, 400.01, 700
See application file for complete search history.

(56) References Cited

U.S. PATENT DOCUMENTS

| | | | |
|---|---|---|---|
| 7,911,177 B2 * | 3/2011 | Ohtani et al. ................. | 318/811 |
| 2007/0290633 A1 | 12/2007 | Atarashi et al. | |
| 2009/0248229 A1 | 10/2009 | Okamura et al. | |
| 2010/0140002 A1 | 6/2010 | Miura et al. | |
| 2011/0006723 A1 | 1/2011 | Yamakawa et al. | |

FOREIGN PATENT DOCUMENTS

| | | |
|---|---|---|
| JP | 2006-217762 A | 8/2006 |
| JP | 2007-325397 A | 12/2007 |
| JP | 2008-193762 A | 8/2008 |
| JP | 2008-206340 A | 9/2008 |
| JP | 2009-225634 A | 10/2009 |
| JP | 2010-081682 A | 4/2010 |
| JP | 2010-114987 A | 5/2010 |

* cited by examiner

*Primary Examiner* — David S Luo
(74) *Attorney, Agent, or Firm* — Kenyon & Kenyon LLP

(57) ABSTRACT

An ECU sets target value of a system voltage based on an electric power loss of a motor generator and an inverter and controls a voltage boost converter. The ECU calculates the target value of the system voltage using a function expression generated, for each operating point of the motor generator, by approximating a loss characteristic which represents change of the electric power loss with respect to change of the system voltage, by a quadratic expression or a linear expression of the system voltage.

16 Claims, 19 Drawing Sheets

FIG.2

| | PWM CONTROL MODE | | RECTANGULAR-WAVE VOLTAGE CONTROL MODE |
|---|---|---|---|
| CONTROL SCHEME | SINE WAVE PWM | OVERMODULATION PWM | RECTANGULAR WAVE (ONE PULSE) |
| WAVEFORM OF INVERTER'S OUTPUT VOLTAGE | FUNDAMENTAL COMPONENT | FUNDAMENTAL COMPONENT | FUNDAMENTAL COMPONENT |
| MODULATION RATIO | 0 TO ABOUT 0.61 | MAX BY SINE WAVE PWM TO 0.78 | 0.78 |
| CHARACTERISTICS | SMALL TORQUE VARIATION | IMPROVED OUTPUT FOR MIDDLE SPEED RANGE | IMPROVED OUTPUT FOR HIGH SPEED RANGE |

FIG.3

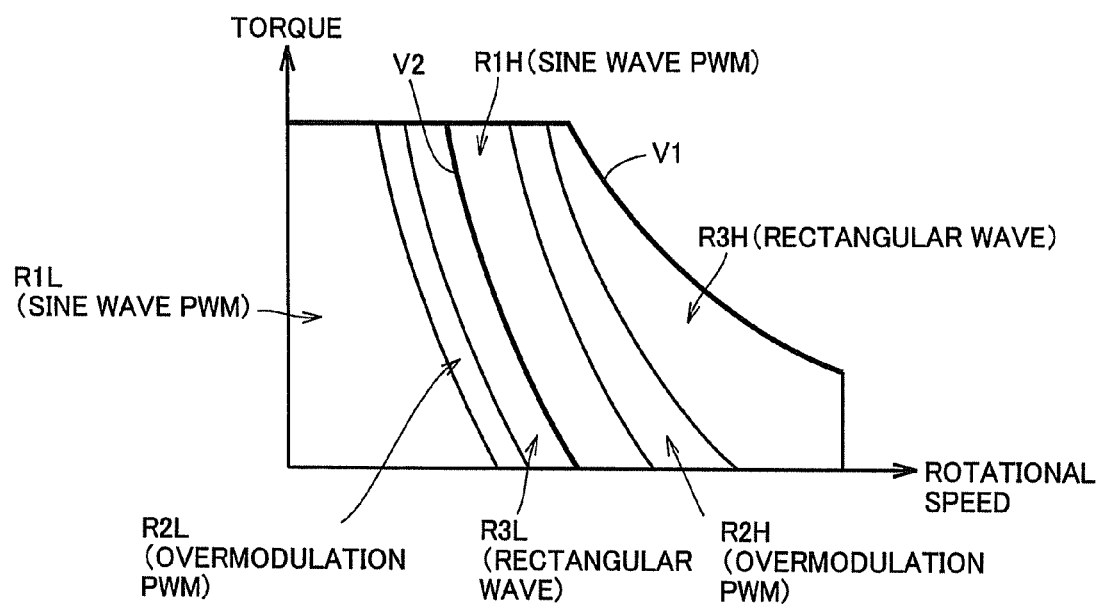

FIG.8

MAP(a1)   MAP(b1)   MAP(VH1)

| | | MG1 ROTATIONAL SPEED | | | |
|---|---|---|---|---|---|
| | | 0 | N1(1) | N1(2) | ... |
| MG1 TORQUE | 0 | a1(11) | a1(12) | a1(13) | ... |
| | TR1(1) | a1(21) | a1(22) | a1(23) | ... |
| | TR1(2) | a1(31) | a1(32) | a1(33) | ... |
| | . | . | . | . | |
| | . | . | . | . | |

FIG.9

MAP(a2)   MAP(b2)   MAP(VH2)

| | | MG2 ROTATIONAL SPEED | | | |
|---|---|---|---|---|---|
| | | 0 | N2(1) | N2(2) | ... |
| MG2 TORQUE | 0 | a2(11) | a2(12) | a2(13) | ... |
| | TR2(1) | a2(21) | a2(22) | a2(23) | ... |
| | TR2(2) | a2(31) | a2(32) | a2(33) | ... |
| | . | . | . | . | |
| | . | . | . | . | |

MAP(a3, b3)

| IB | a3 | b3 |
|---|---|---|
| 0 | a3(1) | b3(1) |
| IB(1) | a3(2) | b3(2) |
| IB(2) | a3(3) | b3(3) |
| . | . | . |
| . | . | . |

FIG.17

MAP(a3, b3, c3)

| IB | a3 | b3 | c3 |
|---|---|---|---|
| 0 | a3(1) | b3(1) | c3(1) |
| IB(1) | a3(2) | b3(2) | c3(2) |
| IB(2) | a3(3) | b3(3) | c3(3) |
| . | . | . | . |
| . | . | . | . |

|  |  | MG1 ROTATIONAL SPEED | | | | |
|---|---|---|---|---|---|---|
|  |  | 0 | N1(1) | N1(2) | ... | |
| MG1 TORQUE | 0 | MAP(11) | MAP(12) | MAP(13) | ... | |
|  | TR1(1) | MAP(21) | MAP(22) | MAP(23) | ... | |
|  | TR1(2) | MAP(31) | MAP(32) | MAP(33) | ... | |
|  | . | . | . | . | | |
|  | . | . | . | . | | |

MOTOR DRIVE APPARATUS AND VEHICLE INCLUDING THE SAME, AND METHOD FOR CONTROLLING MOTOR DRIVE APPARATUS

CROSS-REFERENCE TO RELATED APPLICATIONS

This is a national phase application based on the PCT International Patent Application No. PCT/JP2011/065010 filed on Jun. 30, 2011, the entire contents of which are incorporated herein by reference.

TECHNICAL FIELD

The present invention relates to a motor drive apparatus and a vehicle including the same, and a method for controlling a motor drive apparatus. The invention particularly relates to a motor drive apparatus including a voltage boost circuit between a DC (direct current) power supply and a drive unit which drives a motor, and a vehicle including this motor drive apparatus, as well as a method for controlling a motor drive apparatus.

BACKGROUND ART

Japanese Patent Laying-Open No. 2010-81682 (PTD 1) discloses a motor drive control apparatus including an inverter which is capable of driving a motor by selectively using a PWM (Pulse Width Modulation) voltage and a rectangular-wave voltage, and a voltage boost converter which is capable of boosting an inverter voltage relative to a battery voltage. In this motor drive control apparatus, a map to be used for setting a target post-boost voltage for a motor MG2 is generated in advance. This map defines a relationship between the rotational speed and a torque command value and a target post-boost voltage for motor MG2, which is a target value of the post-boost voltage. This map is used to derive a target post-boost voltage corresponding to a target operating point of motor MG2. By way of example, the map to be used for setting a target post-boost voltage for motor MG2 is generated in such a manner that makes a loss of a motor drive system as small as possible at each motor MG2's operating point in a voltage boost region and that defines a target value of the post-boost voltage which can cancel an induced voltage at that operating point (see PTD 1).

CITATION LIST

Patent Document

PTD 1: Japanese Patent Laying-Open No. 2010-81682
PTD 2: Japanese Patent Laying-Open No. 2009-225634
PTD 3: Japanese Patent Laying-Open No. 2008-206340
PTD 4: Japanese Patent Laying-Open No. 2010-114987
PTD 5: Japanese Patent Laying-Open No. 2008-193762

SUMMARY OF INVENTION

Technical Problem

The motor drive control apparatus disclosed in the above-referenced Japanese Patent Laying-Open No. 2010-81682 uses the map to be used for setting a target post-boost voltage for motor MG2 to thereby derive a target post-boost voltage corresponding to a target operating point of motor MG2. In the case of such a method using a map to directly determine a target post-boost voltage, it is necessary, for addressing a loss of the whole system, to select the maximum one of target post-boost voltages which are derived for system's devices respectively by means of setting maps generated in advance for respective devices, for example, to thereby determine the final target post-boost voltage. This approach, however, may fail to minimize the loss of the whole system even if it can minimize a loss of a certain system device.

Accordingly, an object of the present invention is to provide a motor drive apparatus capable of minimizing a loss of the whole system as well as a vehicle including this apparatus.

Another object of the present invention is to provide a method for controlling a motor drive apparatus capable of minimizing a loss of the whole system.

Solution to Problem

In accordance with the present invention, the motor drive apparatus is a motor drive apparatus driving at least one motor, and includes a drive unit, a voltage boost circuit, and a control device. The drive unit selectively makes a switch between a PWM control mode in which a pulse-width-modulated voltage is applied to the at least one motor, and a rectangular-wave voltage control mode in which a phase-controlled rectangular-wave voltage is applied to the at least one motor, and the drive unit drives the at least one motor. The voltage boost circuit is provided between a DC power supply and the drive unit and performs voltage boost so that a system voltage representing a voltage for the drive unit is equal to or higher than a voltage of the DC power supply. The control device sets a target value of the system voltage based on an electric power loss of the drive unit and the at least one motor, and controls the voltage boost circuit. The control device calculates the target value of the system voltage using a function expression generated, for each operating point of the at least one motor, by approximating a loss characteristic which represents change of the loss with respect to change of the system voltage, by a quadratic expression or a linear expression of the system voltage.

Preferably, the at least one motor includes first and second motors. The drive unit includes first and second drive circuits driving the first and second motors, respectively. The control device calculates the target value of the system voltage using a third function expression generated by adding a second function expression to a first function expression, the first function expression is generated, for each operating point of the first motor, by approximating a loss characteristic of the first motor and the first drive circuit with respect to change of the system voltage, by a quadratic expression or a linear expression of the system voltage, and the second function expression is generated, for each operating point of the second motor, by approximating a loss characteristic of the second motor and the second drive circuit with respect to change of the system voltage, by a quadratic expression or a linear expression of the system voltage.

Preferably, for an operating point for which the PWM control mode and the rectangular-wave voltage control mode are selectively switched to each other according to change of the system voltage, the control device calculates the target value of the system voltage using two different function expressions generated by approximating the loss characteristic for being applied respectively to a region for which the PWM control mode is selected and a region for which the rectangular-wave voltage control mode is selected.

Preferably, the control device calculates the target value of the system voltage using a third function expression generated by adding a second function expression to a first function expression, the first function expression represents the function expression, and the second function expression is generated by approximating a loss characteristic of the voltage boost circuit with respect to change of the system voltage, by a quadratic expression or a linear expression of the system voltage.

More preferably, the control device calculates the target value of the system voltage using, as the second function expression, third and fourth function expressions generated by approximating the loss characteristic of the voltage boost circuit for being applied respectively to a voltage boost region for which a voltage boost operation is performed by the voltage boost circuit and a non-voltage-boost region for which the voltage boost operation is not performed by the voltage boost circuit.

In accordance with the present invention, a vehicle includes one of the above-described motor drive apparatuses.

In accordance with the present invention, the method for controlling a motor drive apparatus is a method for controlling a motor drive apparatus driving at least one motor. The motor drive apparatus includes a drive unit and a voltage boost circuit. The drive unit selectively makes a switch between a PWM control mode in which a pulse-width-modulated voltage is applied to the at least one motor, and a rectangular-wave voltage control mode in which a phase-controlled rectangular-wave voltage is applied to the at least one motor, and the drive unit drives the at least one motor. The voltage boost circuit is provided between a DC power supply and the drive unit and performs a voltage boost so that a system voltage representing a voltage for the drive unit is equal to or higher than a voltage of the DC power supply. The method includes the steps of setting a target value of the system voltage based on an electric power loss of the drive unit and the at least one motor; and controlling the voltage boost circuit based on the target value of the system voltage. The step of setting a target value includes the step of calculating the target value of the system voltage using a function expression generated, for each operating point of the at least one motor, by approximating a loss characteristic which represents change of the electric power loss with respect to change of the system voltage, by a quadratic expression or a linear expression of the system voltage.

Preferably, the at least one motor includes first and second motors. The drive unit includes first and second drive circuits driving the first and second motors, respectively. The step of calculating the target value includes the step of calculating the target value of the system voltage using a third function expression generated by adding a second function expression to a first function expression. The first function expression is generated, for each operating point of the first motor, by approximating a loss characteristic of the first motor and the first drive circuit with respect to change of the system voltage, by a quadratic expression or a linear expression of the system voltage, and the second function expression is generated, for each operating point of the second motor, by approximating a loss characteristic of the second motor and the second drive circuit with respect to change of the system voltage, by a quadratic expression or a linear expression of the system voltage.

Preferably, the step of calculating the target value includes the step of calculating the target value of the system voltage using, for an operating point for which the PWM control mode and the rectangular-wave voltage control mode are selectively switched to each other according to change of the system voltage, two different function expressions generated by approximating the loss characteristic for being applied respectively to a region for which the PWM control mode is selected and a region for which the rectangular-wave voltage control mode is selected.

Preferably, the step of calculating the target value includes the step of calculating the target value of the system voltage using a third function expression generated by adding a second function expression to a first function expression, the first function expression represents the function expression, and the second function expression is generated by approximating a loss characteristic of the voltage boost circuit with respect to change of the system voltage, by a quadratic expression or a linear expression of the system voltage.

More preferably, the step of calculating the target value includes the step of calculating the target value of the system voltage using, as the second function expression, third and fourth function expressions generated by approximating the loss characteristic of the voltage boost circuit for being applied respectively to a voltage boost region for which a voltage boost operation is performed by the voltage boost circuit and a non-voltage-boost region for which the voltage boost operation is not performed by the voltage boost circuit.

Advantageous Effects of Invention

In accordance with the present invention, a target value of the system voltage is calculated using a function expression generated, for each operating point of the motor, by approximating a loss characteristic which represents change of a loss with respect to change of the system voltage, by a quadratic expression or a linear expression of the system voltage. Accordingly, the system voltage with which the loss of the whole system is minimized can be searched for. The present invention can thus minimize the loss of the whole system.

BRIEF DESCRIPTION OF DRAWINGS

FIG. 2 is a diagram illustrating control modes for a motor generator.

FIG. 3 is a diagram illustrating a relationship between an operating state of the motor generator and the control modes shown in FIG. 2.

FIG. 8 is a diagram showing maps for a motor generator MG1.

FIG. 9 is a diagram showing maps for a motor generator MG2.

FIG. 17 is a diagram showing a map for the voltage boost converter.

DESCRIPTION OF EMBODIMENTS

Figure 1:
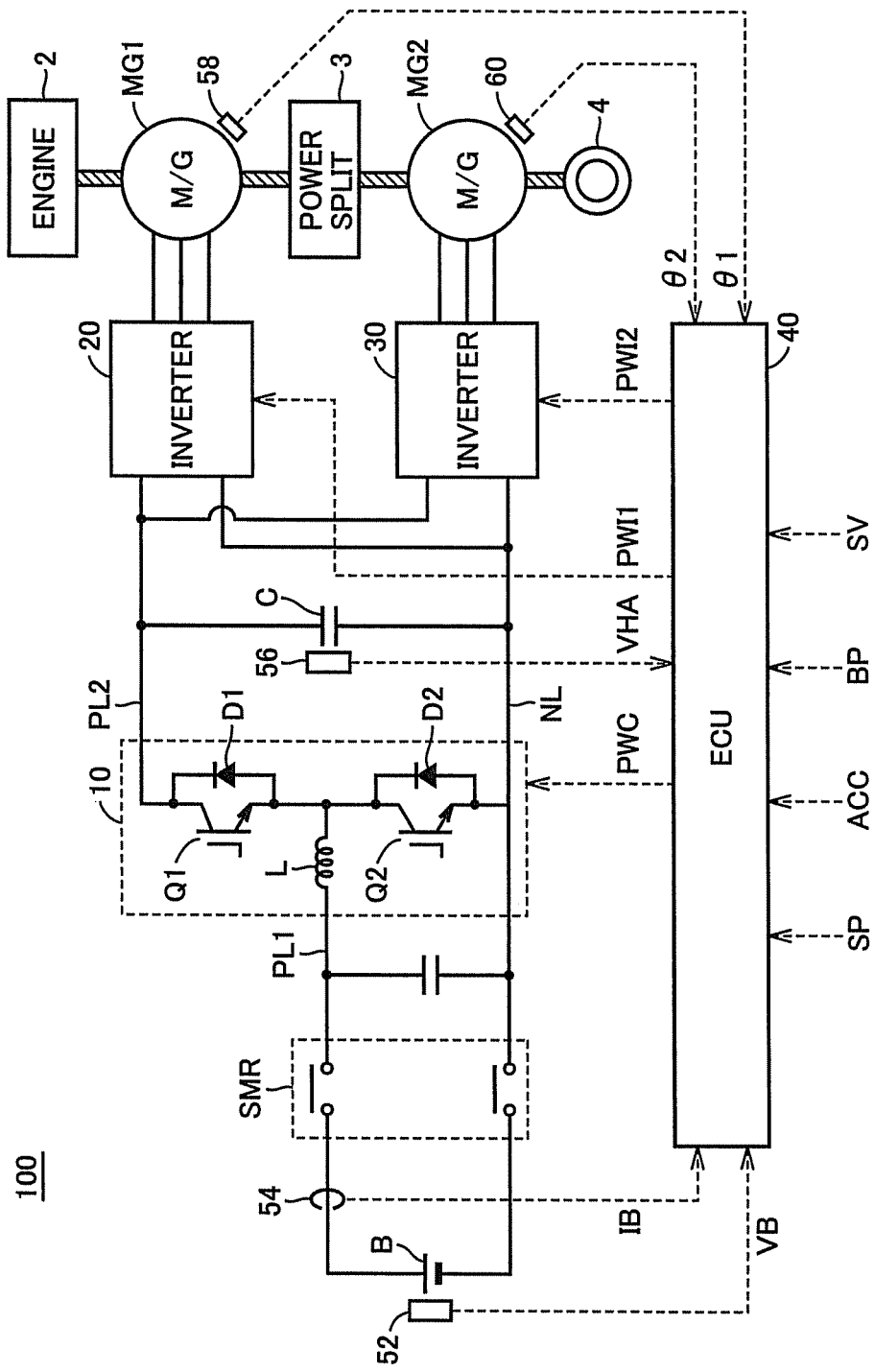
FIG. 1 is an overall block diagram of a hybrid vehicle shown as an example of a vehicle which includes a motor drive apparatus according to a first embodiment of the present invention.

Embodiments of the present invention will hereinafter be described in detail with reference to the drawings. In the drawings, the same or corresponding components are denoted by the same reference characters, and a description thereof will not be repeated.

First Embodiment

FIG. 1 is an overall block diagram of a hybrid vehicle shown as an example of a vehicle which includes a motor drive apparatus according to a first embodiment of the present invention. Referring to FIG. 1, hybrid vehicle 100 includes a power storage device B, a system main relay SMR, a voltage boost converter 10, inverters 20, 30, and a capacitor C. Further, hybrid vehicle 100 includes motor generators MG1, MG2, an engine 2, a power split device 3, and a drive wheel 4. Furthermore, hybrid vehicle 100 includes an electronic control unit (hereinafter "ECU") 40, voltage sensors 52, 56, a current sensor 54, and rotational position sensors 58, 60.

Power storage device B is a rechargeable DC power supply and formed for example by a secondary battery such as nickel-metal hydride or lithium ion battery. Power storage device B supplies DC power to voltage boost converter 10 when system main relay SMR is ON. Power storage device B also receives electric power which is output from voltage boost converter 10 to a positive line PL1 and accordingly charged. A high-capacitance capacitor may be used as power storage device B. System main relay SMR is connected between power storage device B and voltage boost converter 10 to electrically connect/disconnect power storage device B and voltage boost converter 10 to/from each other.

Voltage boost converter 10 is connected between system main relay SMR and inverters 20, 30. Voltage boost converter 10 includes power-semiconductor switching elements (hereinafter simply referred to as "switching elements") Q1, Q2, diodes D1, D2, and a reactor L. Switching elements Q1, Q2 are connected in series between a positive line PL2 and a negative line NL. Diodes D1, D2 are connected in anti-parallel with switching elements Q1, Q2, respectively. Reactor L is connected between positive line PL1 and a connection node between switching elements Q1, Q2.

As switching elements Q1, Q2 each, an IGBT (Insulated Gate Bipolar Transistor), a power MOSFET (Metal Oxide Semiconductor Field-Effect Transistor), or the like may be used, for example.

Voltage boost converter 10 receives electric power supplied from power storage device B and performs a voltage boost based on signal PWC from ECU 40, so that the voltage of positive line PL2 is equal to or higher than the voltage of positive line PL1. Specifically, voltage boost converter 10 stores the current, which flows when switching element Q2 is ON, in reactor L in the form of magnetic field energy, and discharges the stored energy via diode D1 to positive line PL2 when switching element Q2 is OFF, and accordingly the voltage of positive line PL2 can be adjusted to be equal to or higher than the voltage of positive line PL1.

It should be noted that increase of the ON duty cycle of switching element Q2 causes the energy stored in reactor L to increase and accordingly causes the voltage of positive line PL2 to increase. In contrast, increase of the ON duty cycle of switching element Q1 causes the current flowing from positive line PL2 to positive line PL1 to increase and accordingly causes the voltage of positive line PL2 to decrease. In view of the above, the duty ratio between switching elements Q1, Q2 can be controlled to thereby control the voltage of positive line PL2 so that this voltage is any voltage equal to or higher than the voltage of positive line PL1. It should be noted that switching element Q1 can be made constantly ON to make the voltage of positive line PL2 kept equal to the voltage of positive line PL1 (non-boost state).

Inverters 20, 30 are provided in association with motor generators MG1, MG2, respectively, arranged in parallel with each other, and connected to positive line PL2 and negative line NL, respectively. Inverters 20, 30 are each formed by a three-phase bridge circuit, for example. Based on signal PWI1 from ECU 40, inverter 20 drives motor generator MG1 in a power running mode or a regenerative mode. Specifically, when engine 2 is operated, inverter 20 drives motor generator MG1 in the regenerative mode in which inverter 20 converts three-phase AC power generated by motor generator MG1 into DC power and outputs the DC power to positive line PL2. When engine 2 is to be started, inverter 20 drives motor generator MG1 in the power running mode so as to crank engine 2.

Based on signal PWI2 from ECU 40, inverter 30 drives motor generator MG2 in the power running mode or the regenerative mode. Specifically, when the vehicle is accelerated, inverter 30 drives motor generator MG2 in the power running mode based on signal PWI2 and, when the vehicle is braked or the acceleration is slowed down on a downhill, inverter 30 drives motor generator MG2 in the regenerative mode based on signal PWI2.

Engine 2 and motor generators MG1, MG2 are coupled to power split device 3. Hybrid vehicle 100 is caused to travel by a drive force from at least one of engine 2 and motor generator MG2. The motive power generated by engine 2 is split by power split device 3 into two paths. Namely, one is a path along which the motive power is transmitted to drive wheel 4, and the other is a path along which the motive power is transmitted to motor generator MG1.

Motor generator MG1 is an AC rotating electric machine and formed by a three-phase AC synchronous motor in which permanent magnets are embedded in a rotor, for example. Motor generator MG1 generates electric power from kinetic energy of engine 2 split by power split device 3. For example, when the state of charge (SOC) of power storage device B becomes lower than a predetermined value, motor generator MG1 is driven by inverter 20 in the power running mode to start engine 2. After this, motor generator MG1 is driven by inverter 20 in the regenerative mode to output its generated regenerative electric power to inverter 20.

Motor generator MG2 is also an AC rotating electric machine, and formed, like motor generator MG1, by a three-phase AC synchronous motor in which permanent magnets are embedded in a rotor, for example. When the vehicle is accelerated, motor generator MG2 is driven by inverter 30 in the power running mode to generate drive force from at least one of the electric power stored in power storage device B and the electric power generated by motor generator MG1. The drive force of motor generator MG2 is then transmitted to drive wheel 4.

When the vehicle is braked or the acceleration is slowed down on a downhill, motor generator MG2 is driven by inverter 30 in the regenerative mode to receive from drive wheel 4 the mechanical energy stored in the vehicle as the kinetic energy or potential energy, and accordingly generate electric power. Thus, motor generator MG2 operates as a regenerative brake converting the brake energy into electric power. The electric power generated by motor generator MG2 is stored in power storage device B.

Power split device 3 is coupled to engine 2 and motor generators MG1, MG2 to distribute motive power among them. For example, as power split device 3, a planetary gear train having three rotational shafts of a sun gear, a planetary carrier, and a ring gear, respectively, may be used. These three rotational shafts are connected to respective rotational shafts of motor generator MG1, engine 2, and motor generator MG2, respectively. For example, motor generator MG1 may have a hollow rotor through which the crankshaft of engine 2 is passed so that engine 2 and motor generators MG1, MG2 can be mechanically connected to power split device 3. It should be noted that the rotational shaft of motor generator MG2 is coupled to drive wheel 4 by a reduction gear or differential gear (not shown).

Voltage sensor 52 detects a voltage VB of power storage device B and outputs the detected value of the voltage to ECU 40. Current sensor 54 detects current IB which is input/output to/from power storage device B, and outputs the detected value of the current to ECU 40. Voltage sensor 56 detects the voltage across capacitor C, namely a voltage VHA between positive line PL2 and negative line NL, and outputs the detected value of the voltage to ECU 40. Rotational position sensor 58 detects a rotational angle θ1 of motor generator MG1 and outputs the detected value of the angle to ECU 40. Rotational position sensor 60 detects a rotational angle θ2 of motor generator MG2 and outputs the detected value of the angle to ECU 40. In the following, the voltage between positive line PL2 and negative line NL will also be referred to as "system voltage VH."

ECU 40 executes various control operations detailed below through software processing where a program stored in advance is executed by a CPU (Central Processing Unit) (not shown) and/or hardware processing by a dedicated electronic circuit. Specifically, based on shift position signal SP indicating an operational position of a shift lever, accelerator position signal ACC indicating the extent to which an accelerator pedal is pressed down, brake pedal stroke signal BP indicating the extent to which a brake pedal is pressed down, vehicle speed signal SV indicating a vehicle speed, and the like, ECU 40 calculates a torque command value for motor generators MG1, MG2. Further, based on the detection signals of rotational angles θ1, θ2 from rotational position sensors 58, 60, ECU 40 calculates the rotational speed of motor generators MG1, MG2.

ECU 40 then uses the calculated torque command value and rotational speed, system voltage VH, and the like, to generate signals PWI1, PWI2 for driving motor generators MG1, MG2, respectively, and outputs the generated signals PWI1, PWI2 to inverters 20, 30, respectively.

ECU 40 also sets, based on the calculated torque command value and rotational speed, a target value of system voltage VH through a method described later herein. ECU 40 then generates signal PWC for driving voltage boost converter 10 in such a manner that makes voltage VHA detected by voltage sensor 56 equal to the target value of system voltage VH, and outputs the generated signal PWC to voltage boost converter 10.

FIG. 2 is a diagram illustrating control modes for motor generators MG1, MG2. While the following is a representative description in connection with motor generator MG1, the same is applied as well to motor generator MG2. Referring to FIG. 2, hybrid vehicle 100 uses a PWM control mode and a rectangular-wave voltage control mode in such a manner that switches the modes to each other, for controlling motor generator MG1, specifically for electric power conversion in inverter 20.

The PWM control mode includes sine wave PWM control and overmodulation PWM control. In the case of the sine wave PWM control, following a pulse-width-modulated signal generated based on a comparison of the magnitude between a sinusoidal voltage command and a carrier wave (typically a triangular wave), ON/OFF of upper and lower arms of each phase of inverter 20 is controlled. Accordingly, the duty cycles of the upper and lower arms are controlled so that the fundamental component of a set of high-level periods corresponding to ON periods of the upper arm and low-level periods corresponding to ON periods of the lower arm is sinusoidal in a certain period. The sine wave PWM control which restricts the amplitude of the sinusoidal voltage command to not more than the amplitude of the carrier wave can only increase the fundamental component of the voltage applied to motor generator MG1 (hereinafter also referred to simply as "motor voltage") to about 0.61 times as much as the input voltage. In the following, the ratio of the fundamental component (effective value) of the motor voltage (line voltage) to the input voltage to inverter 20 (namely system voltage VH) will be referred to as "modulation ratio."

In the case of the overmodulation PWM control, PWM control is performed similarly to the above-described sine wave PWM control with a range where the amplitude of the voltage command (sine wave component) is larger than the amplitude of the carrier wave. In particular, the voltage command can be distorted relative to the original sinusoidal waveform (amplitude correction) to thereby increase the fundamental wave component, and can increase the modulation ratio to a range from the maximum modulation ratio of the sine wave PWM control to 0.78. In the case of the overmodulation PWM control, the amplitude of the voltage command (sine wave component) is larger than the amplitude of the carrier wave, and therefore, the line voltage applied to motor M1 is not the sine wave but a voltage having a distorted waveform.

The rectangular-wave voltage control applies, to motor generator MG1, one pulse of rectangular wave having a ratio of 1:1 between the high level period and the low level period, in the above-described certain period. Accordingly, the rectangular-wave voltage control increases the modulation ratio to 0.78.

In motor generator MG1, an increase of the rotational speed or the output torque is accompanied by an increase of the induced voltage, and accordingly the drive voltage to be required (motor's required voltage) increases. The voltage boosted by voltage boost converter 10, namely system voltage VH, should be set higher than this motor's required voltage. System voltage VH, however, has a limit value (VH maximum voltage). Therefore, depending on the operating state of motor generator MG1, the PWM control mode based on the sine wave PWM control or the overmodulation PWM control, or the rectangular-wave voltage control mode is selectively applied. Under the rectangular-wave voltage control, the amplitude of the motor applied voltage is fixed. Therefore, the phase of the rectangular-wave voltage pulse is controlled based on a torque deviation from the torque command (torque deviation: difference between the value of the torque to be generated actually (estimated value) and the torque command value), so as to execute torque control.

FIG. 3 is a diagram illustrating a relationship between an operating state of motor generator MG1 (MG2) and the control modes shown in FIG. 2. Regarding FIG. 3 as well, the following is a representative description in connection with motor generator MG1, and the same is applied as well to motor generator MG2. FIG. 3 shows by way of example a region (first quadrant) where the torque and the rotational speed of motor generator MG1 are positive.

Referring to FIG. 3, which of the control modes illustrated in FIG. 2 is to be used is determined essentially on the basis of the modulation ratio. Accordingly, in general, when system voltage VH is V1, the sine wave PWM control is applied to a low rotational speed region R1H where the motor voltage is low and the modulation ratio is low, while the overmodulation PWM control and the rectangular-wave voltage control are applied respectively to a middle rotational speed region R2H and a high rotational speed region R3H where the motor voltage is higher and thus the modulation ratio is higher.

In the case where system voltage VH decreases to V2 (<V1), the rotational speed and the torque that can be output by motor generator MG1 are restricted relative to the case where system voltage VH is V1. The regions to which the control modes are applied are thus shifted according to the decrease of system voltage VH. Specifically, the sine wave PWM control, the overmodulation PWM control, and the rectangular-wave voltage control are applied respectively to regions R1L, R2L, and R3L.

As seen from the above, even when the operating point (torque and rotational speed) of motor generator MG1 remains the same, the control mode may be changed depending on system voltage VH. For example, for the operating points included in region R3L, the sine wave PWM control is applied when system voltage VH is V1, while the rectangular-wave voltage control is applied when system voltage VH is V2. In contrast, for the operating points included in region R1L, the sine wave PWM control is applied regardless of whether system voltage VH is V1 or V2 and, for the operating points included in region R3H, only the rectangular-wave voltage control is applied.

Figure 4:
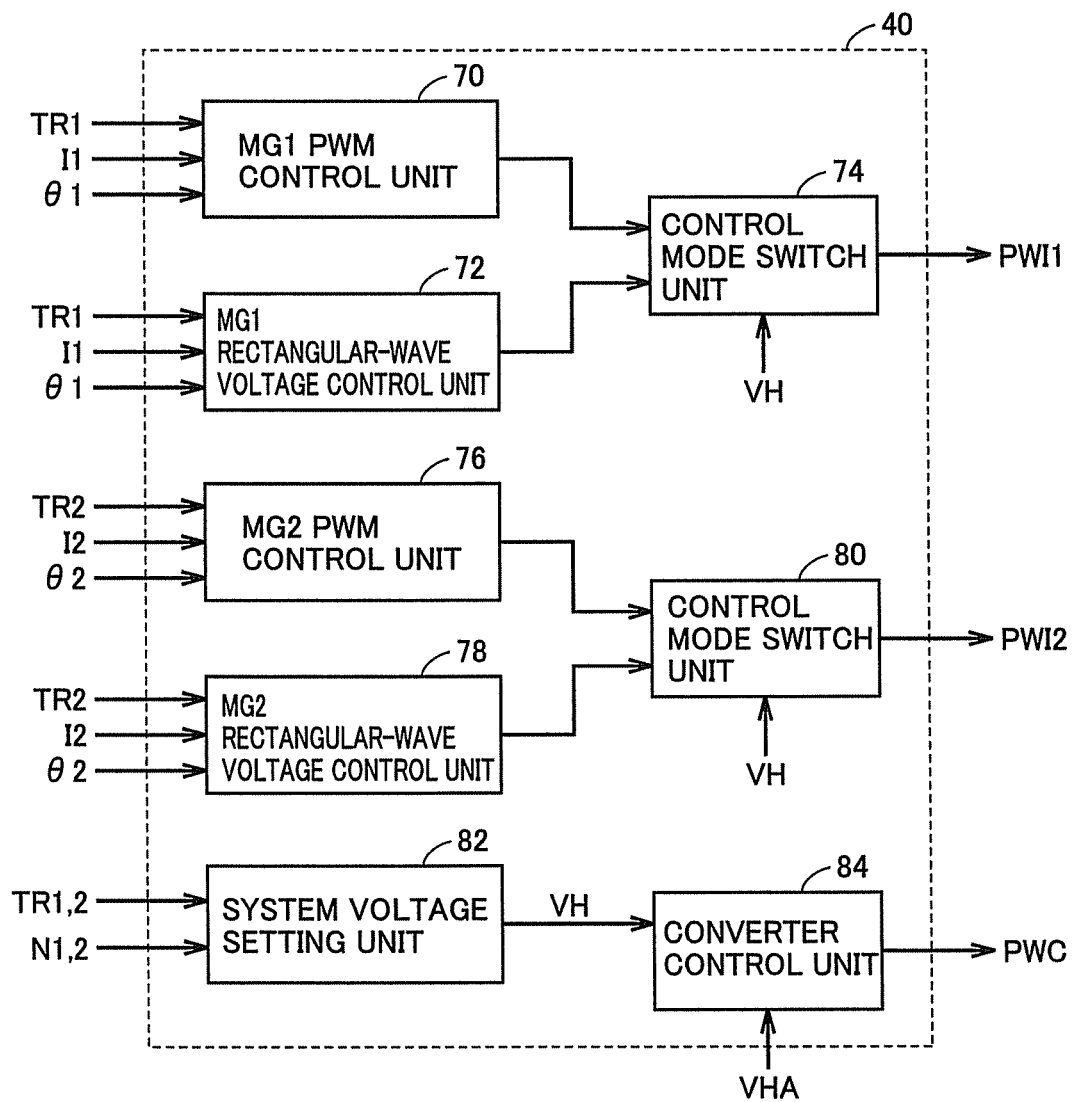
FIG. 4 is a functional block diagram of an ECU shown in FIG. 1.

FIG. 4 is a functional block diagram of ECU 40 shown in FIG. 1. Referring to FIG. 4, ECU 40 includes PWM control units 70, 76, rectangular-wave voltage control units 72, 78, control mode switch units 74, 80, a system voltage setting unit 82, and a converter control unit 84.

PWM control unit 70 (76) receives a torque command value TR1 (TR2) for motor generator MG1 (MG2), current I1 (I2) of motor generator MG1 (MG2) detected by a current sensor (not shown), and rotational angle θ1 (θ2) detected by rotational position sensor 58 (60). Based on these signals, PWM control unit 70 (76) generates a voltage command value for motor generator MG1 (MG2). Based on the generated voltage command value and the carrier wave, PWM control unit 70 (76) generates a PWM signal for driving inverter 20 (30). When the overmodulation PWM control is applied, the voltage amplitude is corrected and the fundamental component of the voltage command value is increased.

Rectangular-wave voltage control unit 72 (78) receives torque command value TR1 (TR2), the detected value of current I1 (I2), and the detected value of rotational angle θ1 (θ2). Based on these signals, rectangular-wave voltage control unit 72 (78) sets a phase of the rectangular-wave voltage and generates a voltage command value (rectangular-wave pulse) for motor generator MG1 (MG2) in accordance with the set voltage phase. Rectangular-wave voltage control unit 72 (78) outputs the generated voltage command value (rectangular-wave pulse) to control mode switch unit 74 (80).

Control mode switch unit 74 (80) calculates the modulation ratio based on the voltage command value calculated by PWM control unit 70 (76) and system voltage VH set by system voltage setting unit 82. Then, based on the calculated modulation ratio, control mode switch unit 74 (80) switches the control mode between the PWM control mode and the rectangular-wave voltage control mode. When the PWM control mode is applied, control mode switch unit 74 (80) outputs the PWM signal received from PWM control unit 70 (76) as signal PWI1 (PWI2) to inverter 20 (30). When the rectangular-wave voltage control mode is applied, it outputs the rectangular-wave pulse signal received from rectangular-wave voltage control unit 72 (78) as signal PWI1 (PWI2) to inverter 20 (30).

System voltage setting unit 82 receives torque command value TR1 and rotational speed N1 of motor generator MG1 as well as torque command value TR2 and rotational speed N2 of motor generator MG2. In accordance with a method described later herein, system voltage setting unit 82 sets a target value of system voltage VH.

Converter control unit 84 receives voltage VHA detected by voltage sensor 56. Converter control unit 84 then generates signal PWC for driving voltage boost converter 10 in such a manner that makes voltage VHA equal to system voltage VH set by system voltage setting unit 82, and outputs the generated signal PWC to voltage boost converter 10.

In the following, a method for setting system voltage VH in the first embodiment will be described.

Figure 5:
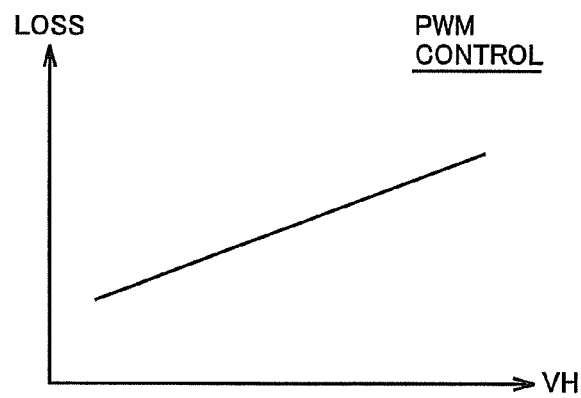
FIG. 5 is a diagram illustrating a tendency of a loss characteristic of an inverter and a motor generator at operating points to which PWM control is applied.
Figure 6:
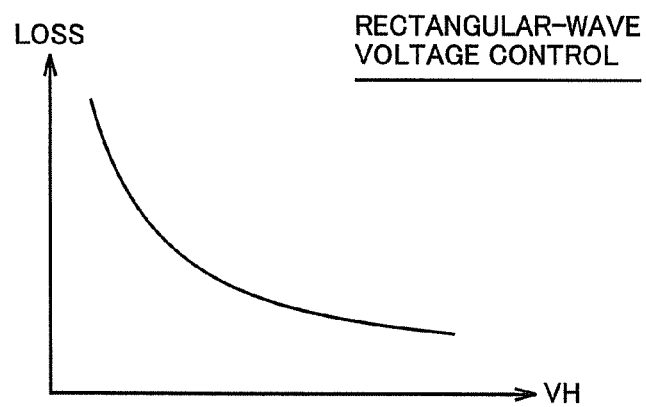
FIG. 6 is a diagram illustrating a tendency of a loss characteristic of an inverter and a motor generator at operating points to which rectangular-wave voltage control is applied.
Figure 7:
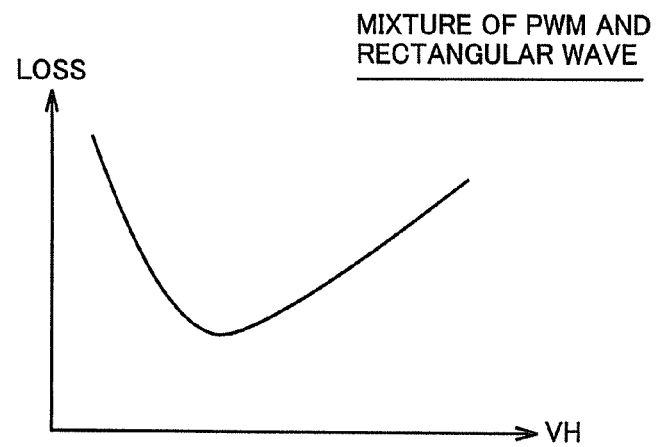
FIG. 7 is a diagram illustrating a tendency of a loss characteristic of an inverter and a motor generator at operating points for which a control mode is switched according to change of a system voltage.

FIGS. 5 to 7 are each a diagram for illustrating a tendency of a loss characteristic, showing a relationship between system voltage VH and an electric power loss (hereinafter also referred to simply as "loss") of the inverter and the motor generator. While the following is a representative description of the loss characteristic of inverter 20 and motor generator MG1, the same is applied as well to the loss characteristic of inverter 30 and motor generator MG2.

FIG. 5 is a diagram showing a tendency of a loss characteristic of inverter 20 and motor generator MG1 at operating points to which the PWM control is applied. Referring to FIG. 5, when the PWM control mode is applied, the loss characteristic of inverter 20 and motor generator MG1 is substantially proportional to system voltage VH. Namely, in the case of the PWM control mode, in accordance with determination of an operating point (torque and rotational speed) of motor generator MG1, the current is determined, and the current is constant regardless of system voltage VH. Therefore, even when system voltage VH changes, the copper loss of motor generator MG1 and the ON loss of inverter 20 remain the same. In contrast, the switching loss of inverter 20 depends on system voltage VH and the switching loss is proportional to system voltage VH. Therefore, when the PWM control mode is applied, the loss characteristic of inverter 20 and motor generator MG1 can be approximated by a linear expression of system voltage VH.

FIG. 6 is a diagram showing a tendency of a loss characteristic of inverter 20 and motor generator MG1 at operating points to which the rectangular-wave voltage control is applied. Referring to FIG. 6, when the rectangular-wave voltage control mode is applied, the loss characteristic of inverter 20 and motor generator MG1 is represented by a curve along which the loss monotonously decreases with increase of system voltage VH and which has no point of inflection. In the case of the rectangular-wave voltage control mode, the motor voltage is constant (the amplitude is constant) and the copper loss of motor generator MG1 is predominant. As system voltage VH changes, the current accordingly changes. When the system voltage VH decreases, the current increases. The tendency that the current increases cannot uniquely be described because the power factor is relevant to this. Since the copper loss is proportional to the square of the current, the first embodiment approximates the loss characteristic of inverter 20 and motor generator MG1 by a quadratic expression of system voltage VH, when the rectangular-wave voltage control mode is applied.

FIG. 7 is a diagram showing a tendency of a loss characteristic of inverter 20 and motor generator MG1 at operating points for which the control mode is switched according to change of system voltage VH. Referring to FIG. 7, as to the operating points, the loss characteristic of inverter 20 and motor generator MG1 is represented by a curve which has one local minimum and has no point of inflection. More specifically, to the operating points, the PWM control mode is applied when system voltage VH is high and the rectangular-wave voltage control mode is applied when system voltage VH is lower, as described above in connection with FIG. 3. Therefore, for the region where system voltage VH is low, the characteristic is represented by a curve close to a quadratic expression of system voltage VH as described above in connection with FIG. 6 and, for the region where system voltage VH is higher, the characteristic is represented by a straight line close to a linear expression of system voltage VH as described above in connection with FIG. 5. Accordingly, in the first embodiment, the loss characteristic of inverter 20 and motor generator MG1 is approximated by a quadratic expression of system voltage VH for the operating points for which the control mode is switched.

Based on the above, in the first embodiment, the loss characteristic of motor generators MG1, MG2 each is approximated by the following function, for each operating point, given by a linear expression or a quadratic expression of system voltage VH.

$$f1(i, VH) = a1(i) \times VH^2 + b1(i) \times VH + c1(i) \quad (1)$$

$$f2(j, VH) = a2(j) \times VH^2 + b2(j) \times VH + c2(j) \quad (2)$$

Here, $f1(i, VH)$ is a function representing the loss characteristic of motor generator MG1 and inverter 20 for operating point i, and $a1(i)$, $b1(i)$, and $c1(i)$ are a coefficient of a quadratic term, a coefficient of a linear term, and a constant term, respectively, of $f1(i, VH)$. Likewise, $f2(j, VH)$ is a function representing the loss characteristic of motor generator MG2 and inverter 30 for operating point j, and $a2(j)$, $b2(j)$, and $c2(j)$ are a coefficient of a quadratic term, a coefficient of a linear term, and a constant term, respectively, of $f2(j, VH)$. For the operating points to which only the PWM control is applied, the coefficient of the quadratic term is zero.

A quadratic term coefficient map and a linear term coefficient map for each operating point are generated in advance, and the function of the loss characteristic is specified in accordance with the operating point at each time. In the first embodiment, calculation of system voltage VH that minimizes the loss does not require constant terms $c1(i)$, $c2(j)$ as described later herein, and therefore, it is unnecessary to generate maps for constant terms $c1(i)$, $c2(j)$.

FIG. 8 is a diagram showing maps for motor generator MG1. Referring to FIG. 8, a map MAP(a1) is a map of quadratic term coefficient $a1(i)$ shown in expression (1), and stores quadratic term coefficient a1 for each operating point (torque and rotational speed) of motor generator MG1. A map MAP(b1) is a map of quadratic term coefficient $b1(i)$ shown in expression (1), and stores quadratic term coefficient b1 of expression (1) for each operating point of motor generator MG1. A map MAP(VH1) is a map for setting a lower limit of system voltage VH that is a minimum requirement for achieving the operation of motor generator MG1, and stores a predetermined lower limit voltage VH1 of system voltage VH for each operating point of motor generator MG1.

FIG. 9 is a diagram showing maps for motor generator MG2. Referring to FIG. 9, a map MAP(a2) is a map of quadratic term coefficient $a2(j)$ shown in expression (2), and stores quadratic term coefficient a2 of expression (2) for each operating point of motor generator MG2. A map MAP(b2) is a map of quadratic term coefficient $b2(j)$ shown in expression (2), and stores quadratic term coefficient b2 of expression (2) for each operating point of motor generator MG2. A map MAP(VH2) is a map for setting a lower limit of system voltage VH that is a minimum requirement for achieving the operation of motor generator MG2, and stores a predetermined lower limit voltage VH2 of system voltage VH for each operating point of motor generator MG2.

Figure 10:
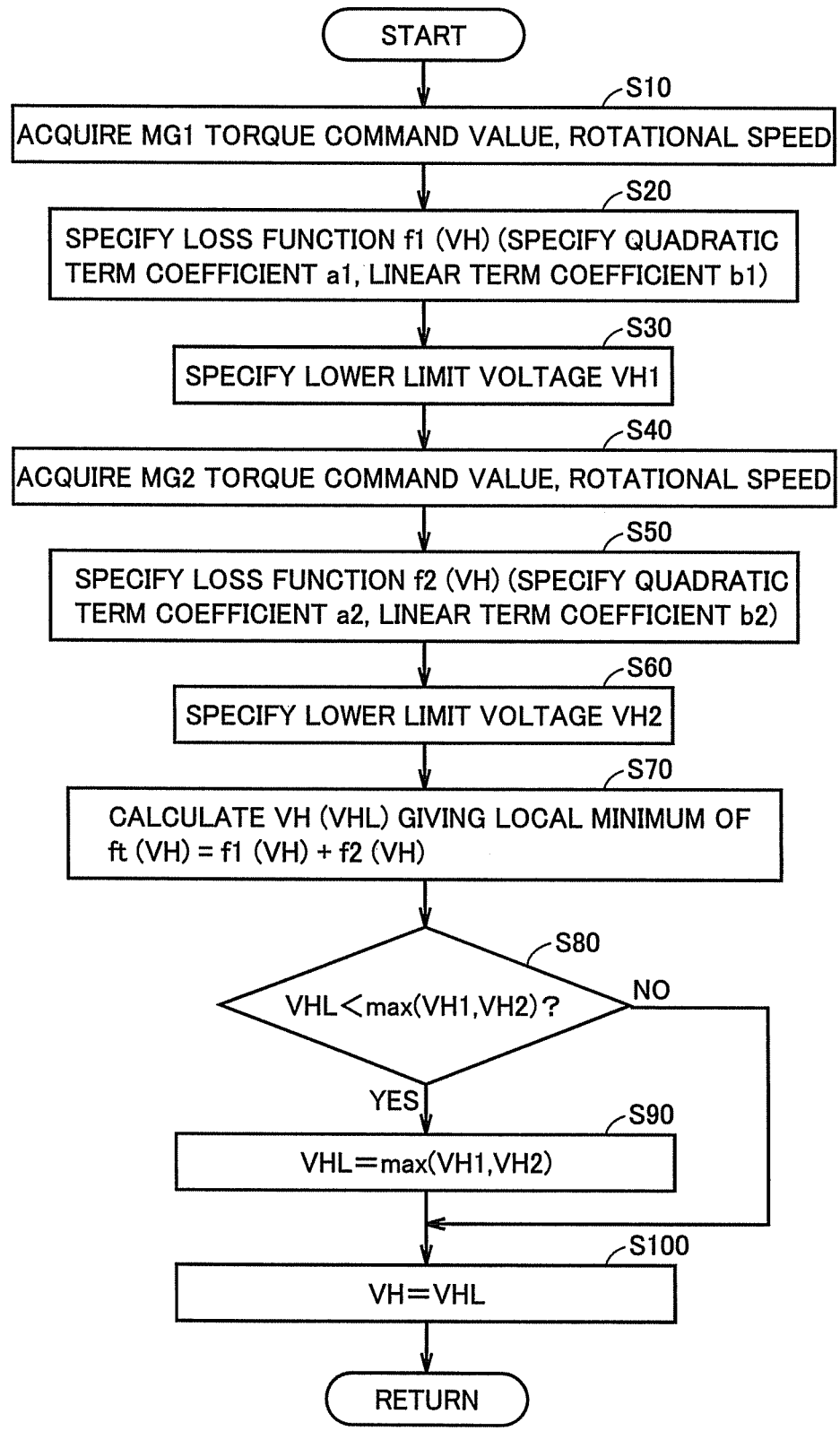
FIG. 10 shows a flowchart for illustrating a procedure of a process of setting a system voltage that is executed by the ECU.

FIG. 10 is a flowchart for illustrating a procedure of a process of setting system voltage VH that is executed by ECU 40. Referring to FIG. 10, ECU 40 acquires torque command value TR1 and rotational speed N1 of motor generator MG1 (step S10). Then, ECU 40 specifies loss function f1(VH) of motor generator MG1 and inverter 20 for the operating point of motor generator MG1 acquired in step S10 (step S20). More specifically, ECU 40 refers to maps MAP(a1), MAP(b1) shown in FIG. 8 to specify quadratic term coefficient a1 and linear term coefficient b1 of loss function f1(VH) for the operating point of motor generator MG1 that is acquired in step S10. Further, ECU 40 refers to map MAP(VH1) shown in FIG. 8 to specify lower limit voltage VH1 for the operating point of motor generator MG1 that is acquired in step S10 (step S30).

For motor generator MG2 as well, ECU 40 acquires torque command value TR2 and rotational speed N2 of motor generator MG2 (step S40). Then, ECU 40 specifies loss function f2(VH) of motor generator MG2 and inverter 30 for the operating point of motor generator MG2 acquired in step S40 (step S50). More specifically, ECU 40 refers to maps MAP(a2), MAP(b2) shown in FIG. 9 to specify quadratic term coefficient a2 and linear term coefficient b2 of loss function f2(VH) for the operating point of motor generator MG2 that is acquired in step S40. Further, ECU 40 refers to map MAP (VH2) shown in FIG. 9 to specify lower limit voltage VH2 for the operating point of motor generator MG2 that is acquired in step S40 (step S60).

Subsequently, ECU 40 adds loss function f2(VH) to loss function f1(VH) to thereby calculate a function ft(VH) representing the loss of motor generators MG1, MG2 and inverters 20, 30 as a whole. Then, ECU 40 calculates voltage VHL representing system voltage VH that gives a local minimum of function ft(VH), based on the following expression (step S70).

$$VHL=-(b1+b2)/\{2\times(a1+a2)\} \qquad (3)$$

Here, a1, b1 are coefficients specified in step S20, and a2, b2 are coefficients specified in step S50. This expression (3) is acquired by setting to zero the value of the derivative of function ft(VH).

Subsequently, ECU 40 determines whether or not voltage VHL is lower than the larger one of lower limit voltages VH1, VH2 (max (VH1, VH2)) specified respectively in steps S30, S60 (step S80). When it is determined that voltage VHL is lower than max (VH1, VH2) (YES in step S80), ECU 40 replaces the value of voltage VHL calculated in step S70 with max (VH1, VH2) (step S90). When it is determined in step S80 that voltage VHL is equal to or larger than max (VH1, VH2) (NO in step S80), ECU 40 proceeds to step S100. Then, ECU 40 sets voltage VHL to system voltage VH (target value) (step S100).

As seen from the foregoing, in the first embodiment, system voltage VH is set by means of the expression of the function generated by approximating the loss characteristic, which represents a change of the loss with respect to change of system voltage VH, by a quadratic expression or linear expression of system voltage VH for each operating point of motor generators MG1, MG2. Accordingly, system voltage VH that makes the loss of the whole system minimum can be searched for. The first embodiment can therefore minimize the loss of the system as a whole.

Second Embodiment

In a second embodiment, a loss of voltage boost converter 10 is further taken into consideration.

A hybrid vehicle in the second embodiment has an overall configuration identical to that of hybrid vehicle 100 in the first embodiment shown in FIG. 1. In addition, the overall configuration of ECU's functions is also identical to that of ECU 40 in the first embodiment shown in FIG. 4.

Figures 11, 12:
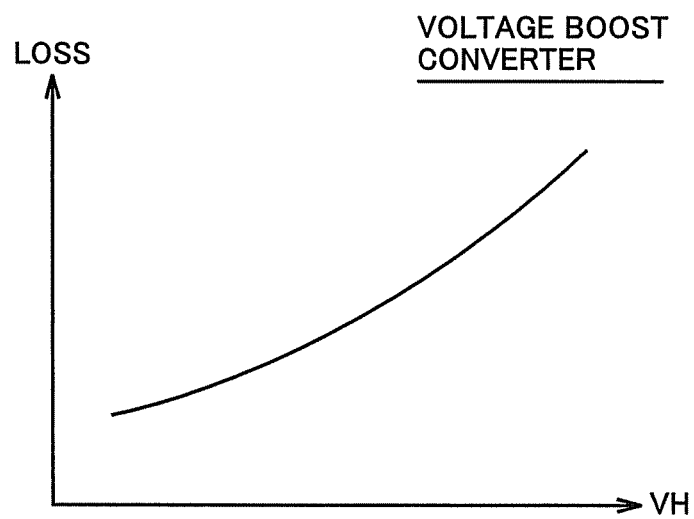
FIG. 11 is a diagram illustrating a tendency of a loss characteristic, showing a relationship between a system voltage and a loss of a voltage boost converter under the condition that the current of a power storage device is constant.
FIG. 12 is a diagram showing a map for the voltage boost converter.

FIG. 11 is a diagram illustrating a tendency of a loss characteristic, showing a relationship between system voltage VH and a loss of voltage boost converter 10 under the condition that current IB of power storage device B is constant. Referring to FIG. 11, the loss characteristic of voltage boost converter 10 is represented by a curve along which the loss monotonously increases with increase of system voltage VH and which has no point of inflection. In view of this, the loss characteristic of voltage boost converter 10 is also approximated by a quadratic expression of system voltage VH.

The loss characteristic of voltage boost converter 10 is approximated by the following function given by a quadratic expression of system voltage VH for each value of current IB of power storage device B, instead of each operating point of the motor generator.

$$f3(k,VH)=a3(k)\times VH^2+b3(k)\times VH+c3(k) \qquad (4)$$

Here, f3(k, VH) is a function representing the loss characteristic of voltage boost converter 10 when the value of current IB is IB(k), and a3(k), b3(k), and c3(k) are a coefficient of a quadratic term, a coefficient of a linear term, and a constant term, respectively, of f3(k, VH). The loss characteristic of voltage boost converter 10 may also be approximated by a linear expression of system voltage VH, supposing that the loss characteristic is proportional to system voltage VH. In this case, a3(k) may be set to zero.

Then, a quadratic term coefficient map and a linear term coefficient map for each current IB are prepared and a function of the loss characteristic is specified in accordance with current IB. The second embodiment also does not require constant term c3(k) for calculation of system voltage VH that makes the loss minimum. Therefore, no map is necessary for constant term c3(k).

FIG. 12 is a diagram showing a map for voltage boost converter 10. Referring to FIG. 12, map MAP(a3, b3) is a map of quadratic term coefficient a3(k) and linear term coefficient b3(k) shown in expression (4), and stores quadratic term coefficient a3 and linear term coefficient b3 of expression (4) for each current IB.

Figure 13:
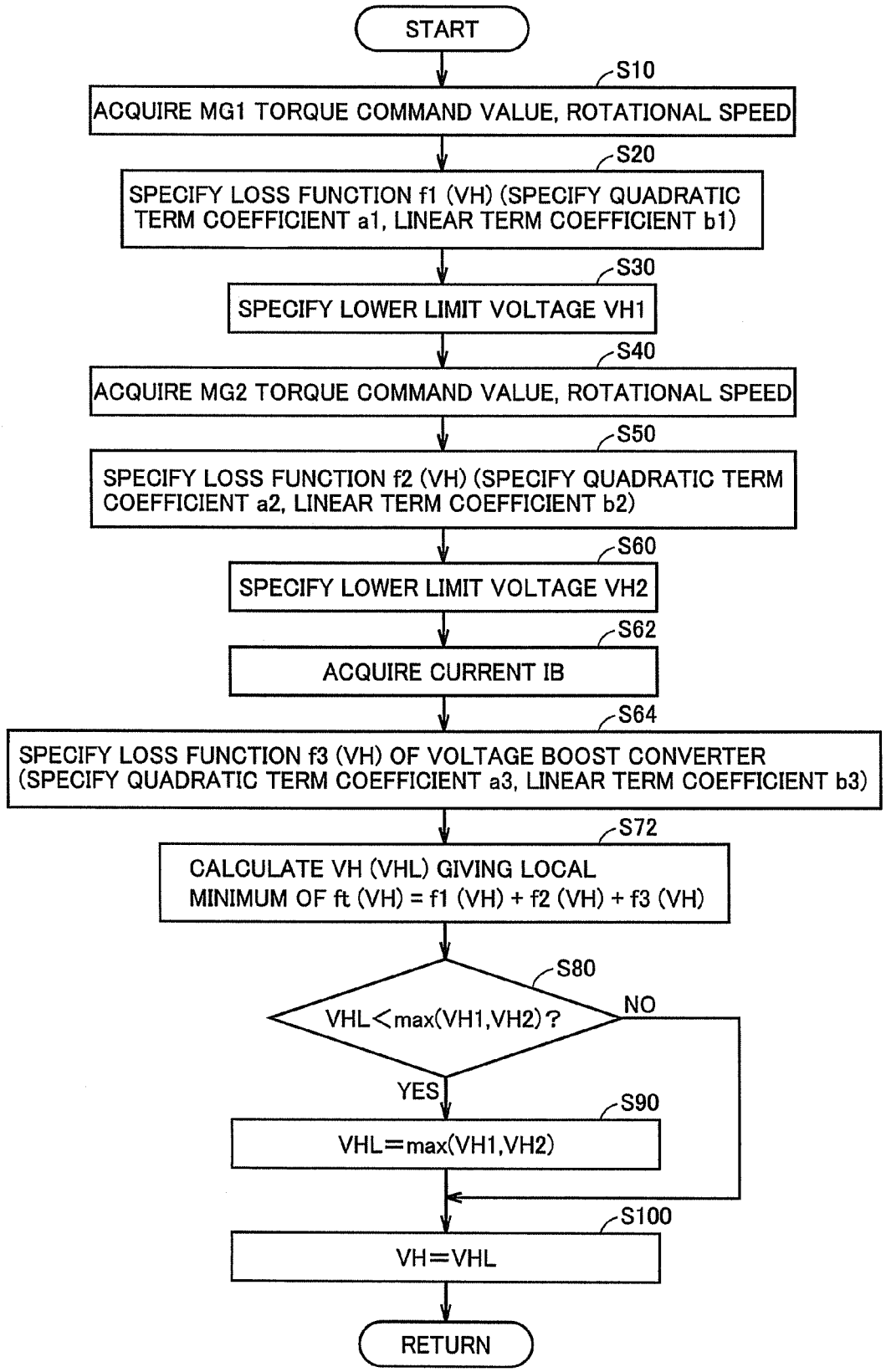
FIG. 13 shows a flowchart for illustrating a procedure of a process of setting a system voltage that is executed by the ECU in a second embodiment.

FIG. 13 is a flowchart for illustrating a procedure of a process of setting system voltage VH that is executed by ECU 40 in the second embodiment. Referring to FIG. 13, this flowchart is similar to the flowchart shown in FIG. 10 except that the former further includes steps S62, S64 and includes step S72 instead of step S70.

Specifically, after lower limit voltage VH2 is specified in step S60, ECU 40 acquires current IB detected by current sensor 54 (FIG. 1) (step S62). Then, ECU 40 specifies loss function f3(VH) of voltage boost converter 10 for the acquired current IB (step S64). More specifically, ECU 40 refers to map MAP(a3, b3) shown in FIG. 12 to specify quadratic term coefficient a3 and linear term coefficient b3 of loss function f3(VH) for current IB that is acquired in step S62.

Subsequently, ECU 40 adds loss function f2(VH) to loss function f1(VH) and further adds loss function f3(VH) thereto to thereby calculate a function ft(VH) representing the loss of motor generators MG1, MG2 and inverters 20, 30 as well as voltage boost converter 10 as a whole. Then, ECU 40 calculates voltage VHL representing system voltage VH that gives a local minimum of function ft(VH), based on the following expression (step S72).

$$VHL=-(b1+b2+b3)/\{2\times(a1+a2+a3)\} \qquad (5)$$

Here, a3, b3 are coefficients specified in step S64. This expression (5) is obtained by setting the value of the derivative of function ft(VH) to zero. After voltage VHL is calculated in step S72, the process proceeds to step S80.

According to the above description, the loss characteristic of voltage boost converter 10 is approximated by the quadratic function of system voltage VH. However, since the relationship between system voltage VH and voltage boost converter 10 is relatively close to the proportional relationship, the loss characteristic of voltage boost converter 10 may also be approximated by a linear function of system voltage VH.

As seen from the foregoing, in accordance with the second embodiment, the loss of the whole system including voltage boost converter 10 can be made minimum.

Third Embodiment

As described above in connection with FIG. 7, in the case of the loss characteristic at the operating points for which the control mode is switched according to change of system voltage VH, the loss characteristic is represented by a curve close to a quadratic expression of system voltage VH for the region in which system voltage VH is low and the rectangular-wave voltage control mode is selected, while the loss characteristic is represented by a straight line close to a linear expression of system voltage VH for the region in which system voltage VH is higher and the PWM control mode is selected. In the above-described embodiment, the loss characteristic at the operating points is approximated by a quadratic expression of system voltage VH.

In this third embodiment, the loss characteristic at the operating points for which the control mode is switched according to change of system voltage VH is approximated by means of different functions for the region for which the rectangular-wave voltage control mode is selected and the region for which the PWM control mode is selected, respectively.

Figure 14:
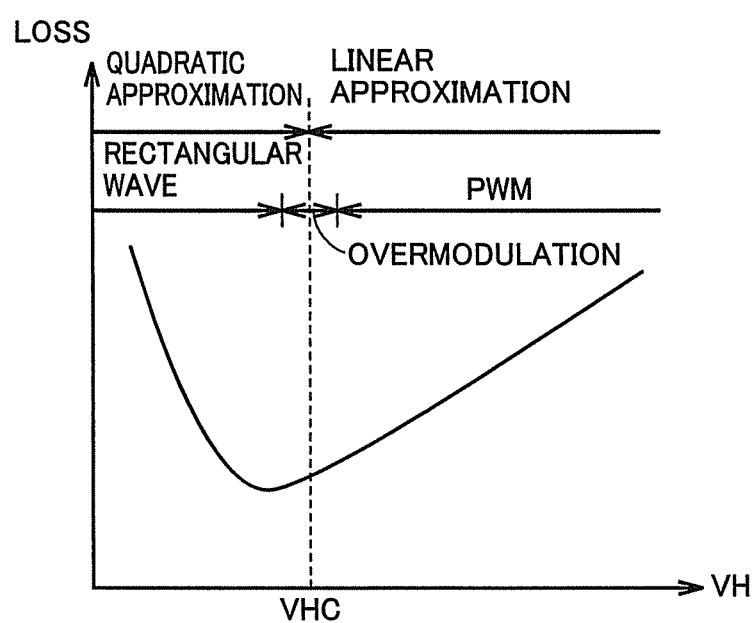
FIG. 14 is a diagram illustrating a tendency of a loss characteristic of the inverter and the motor generator at operating points for which the control mode is switched according to change of the system voltage.

FIG. 14 is a diagram showing a tendency of the loss characteristic of inverter 20 and motor generator MG1 at operating points for which the control mode is switched according to change of system voltage VH. Referring to FIG. 14, in this third embodiment, for the operating points for which the control mode is switched, the loss characteristic of inverter 20 (30) and motor generator MG1 (MG2) is approximated by a quadratic expression of system voltage VH for the region in which system voltage VH is lower than VHC and the rectangular-wave voltage control mode is predominant, while the loss characteristic thereof is approximated by a linear expression of system voltage VH for the region in which system voltage VH is higher than VHC and the PWM control mode is predominant.

Specifically, the loss characteristic of inverter 20 and motor generator MG1 is approximated by the following functions for each of the operating points for which the control mode is switched.

$$VH < VHC1 : f11(VH) = a11 \times VH^2 + b11 \times VH + c11 \quad (6)$$

$$VH \geq VHC1 : f12(VH) = b12 \times VH + c12 \quad (7)$$

Here, f11(VH) is a function representing the loss characteristic of motor generator MG1 and inverter 20 in the case where system voltage VH is lower than switch voltage VHC1, and a11, b11, and c11 are a quadratic term coefficient, a linear term coefficient, and a constant term of f11(VH), respectively. In addition, f12(VH) is a function representing the loss characteristic of motor generator MG1 and inverter 20 in the case where system voltage VH is equal to or higher than switch voltage VHC1, and b12 and c12 are a linear term coefficient and a constant term, respectively, of f12(VH). Switch voltage VHC1 is also set for each operating point.

Likewise, as to the loss characteristic of inverter 30 and motor generator MG2, the loss characteristic at operating points for which the control mode is switched is approximated by the following function for each operating point.

$$VH < VHC2 : f21(VH) = a21 \times VH^2 + b21 \times VH + c21 \quad (8)$$

$$VH \geq VHC2 : f22(VH) = b22 \times VH + c22 \quad (9)$$

Here, f21(VH) is a function representing the loss characteristic of motor generator MG2 and inverter 30 in the case where system voltage VH is lower than switch voltage VHC2, and a21, b21, and c21 are a quadratic term coefficient, a linear term coefficient, and a constant term, respectively, of f21 (VH). In addition, f22(VH) is a function representing the loss characteristic of motor generator MG2 and inverter 30 in the case where system voltage VH is equal to or higher than switch voltage VHC2, and b22 and c22 are a linear term coefficient and a constant term, respectively, of f22(VH). Switch voltage VHC2 is also set for each operating point.

Figure 15:
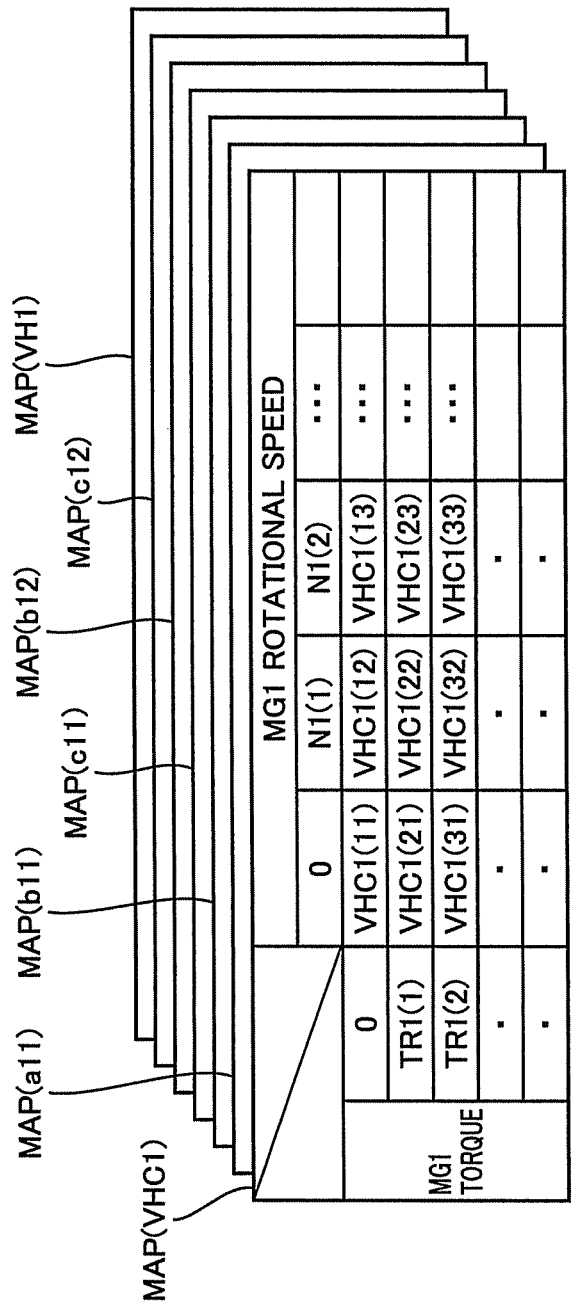
FIG. 15 is a diagram showing maps for motor generator MG1 in a third embodiment.

FIG. 15 is a diagram showing maps for motor generator MG1 in the third embodiment. Referring to FIG. 15, map MAP(VHC1) is a map of switch voltage VHC1, and stores switch voltage VHC1 for each operating point (torque and rotational speed) of motor generator MG1. Map MAP(a11) is a map of quadratic term coefficient a11 shown in expression (6), and stores quadratic term coefficient a11 of expression (6) for each operating point of motor generator MG1. Map MAP (b11) is a map of linear term coefficient b11 shown in expression (6), and stores linear term coefficient b11 of expression (6) for each operating point of motor generator MG1. Map MAP(c11) is a map of constant term c shown in expression (6), and stores constant term c11 of expression (6) for each operating point of motor generator MG1.

Map MAP(b12) is a map of linear term coefficient b12 shown in expression (7), and stores linear term coefficient b12 of expression (7) for each operating point of motor generator MG1. Map MAP(c12) is a map of constant term c12 shown in expression (7), and stores constant term c12 of expression (7) for each operating point of motor generator MG1. Map MAP (VH1) stores predetermined lower limit voltage VH1 of system voltage VH for each operating point of motor generator MG1.

For the operating points to which only the PWM control is applied, quadratic term coefficient a11, linear term coefficient b11, and constant term c11 are set to zero. For the operating points to which only the rectangular-wave voltage control is applied, linear term coefficient b12 and constant term c12 are set to zero.

Figure 16:
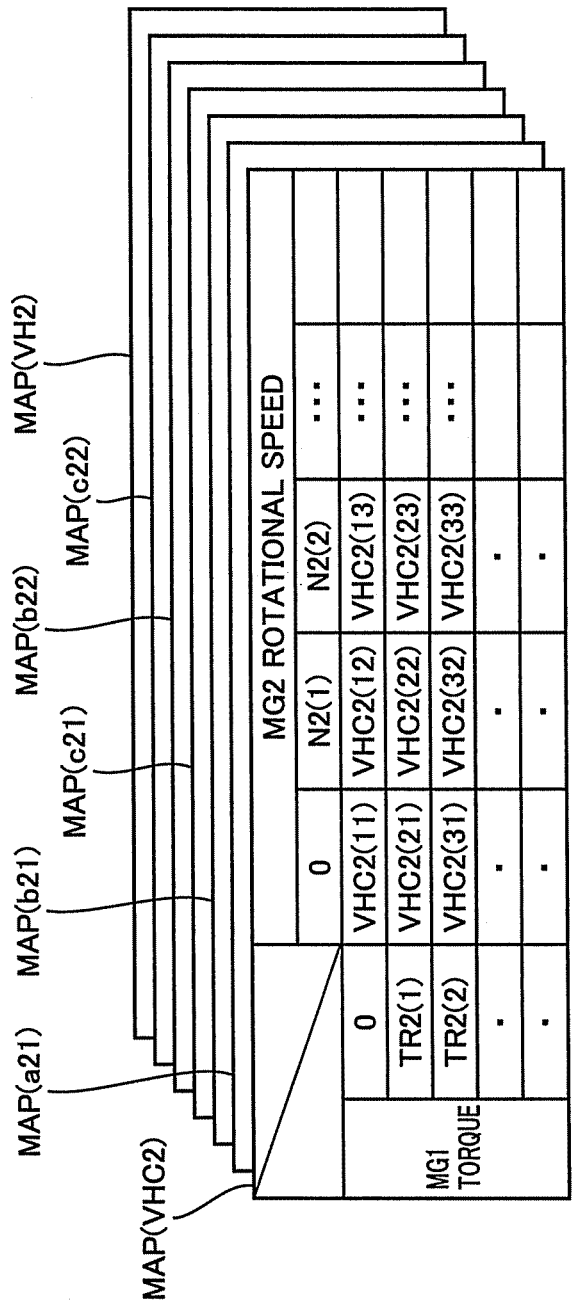
FIG. 16 is a diagram showing maps for motor generator MG2 in the third embodiment.

FIG. 16 is a diagram showing maps for motor generator MG2. Referring to FIG. 16, map MAP(VHC2) is a map of switch voltage VHC2, and stores switch voltage VHC2 for each operating point of motor generator MG2. Map MAP (a21) is a map of quadratic term coefficient a21 shown in expression (8), and stores quadratic term coefficient a21 of expression (8) for each operating point of motor generator MG2. Map MAP(b21) is a map of linear term coefficient b21 shown in expression (8), and stores linear term coefficient b21 of expression (8) for each operating point of motor generator MG2. Map MAP(c21) is a map of constant term c21 shown in expression (8), and stores constant term c21 of expression (8) for each operating point of motor generator MG2.

Map MAP(b22) is a map of linear term coefficient b22 shown in expression (9), and stores linear term coefficient b22 of expression (9) for each operating point of motor generator MG2. Map MAP(c22) is a map of constant term c22 shown in expression (9), and stores constant term c22 of expression (9) for each operating point of motor generator MG2. Map MAP (VH2) stores predetermined lower limit voltage VH2 of system voltage VH for each operating point of motor generator MG2.

For the operating points to which only the PWM control is applied, quadratic term coefficient a21, linear term coefficient b21, and constant term c21 are set to zero. For the operating points to which only the rectangular-wave voltage control is applied, linear term coefficient b22 and constant term c22 are set to zero.

FIG. 17 is a diagram showing a map for voltage boost converter 10. Referring to FIG. 17, map MAP(a3, b3, c3) is a map of quadratic term coefficient a3, linear term coefficient b3, and constant term c3 shown in expression (4), and stores quadratic term coefficient a3, linear term coefficient b3, and constant term c3 of expression (4) for each current IB.

Figure 18:
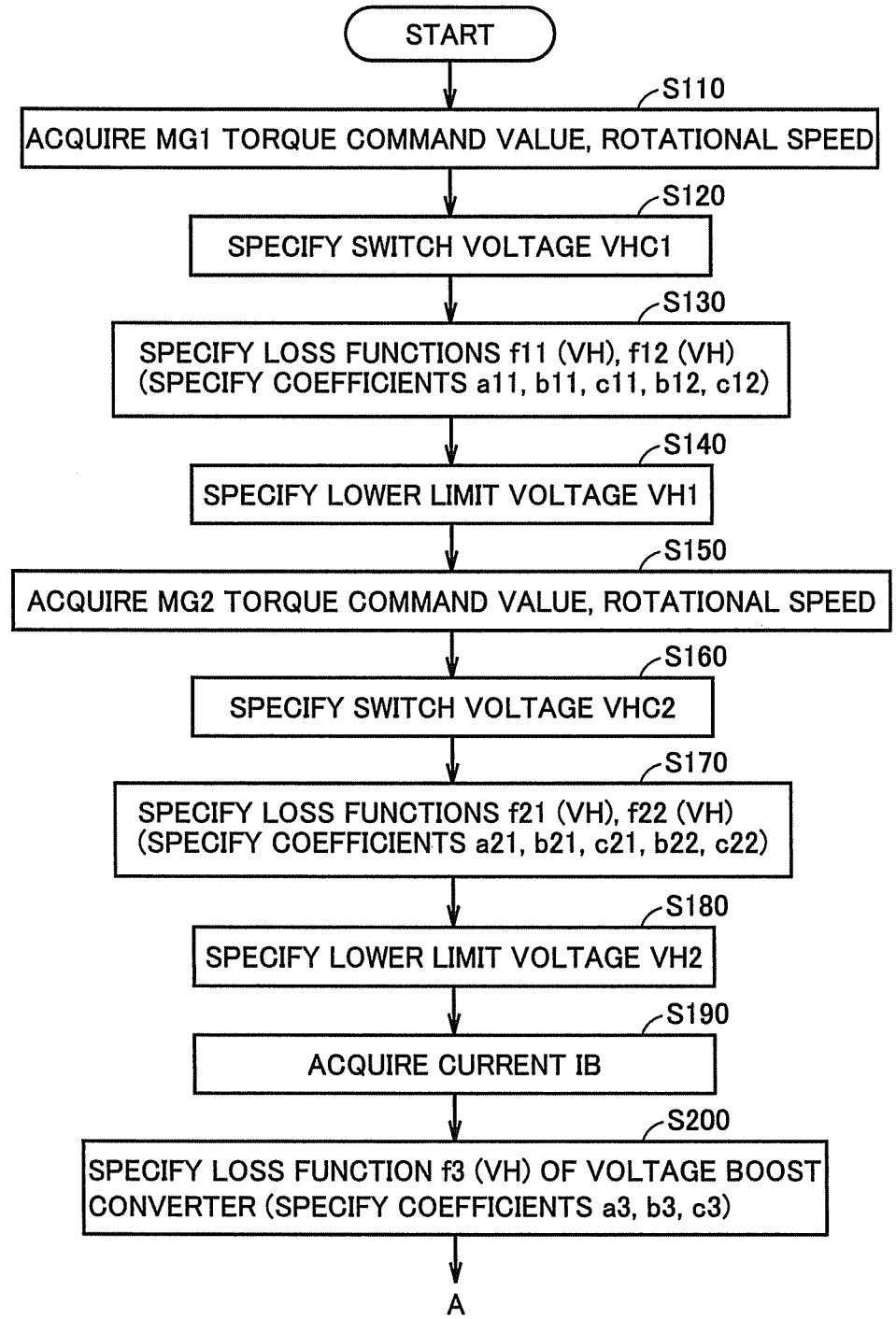
FIG. 18 shows a first flowchart for illustrating a procedure of a process of setting a system voltage that is executed by the ECU in the third embodiment.
Figure 19:
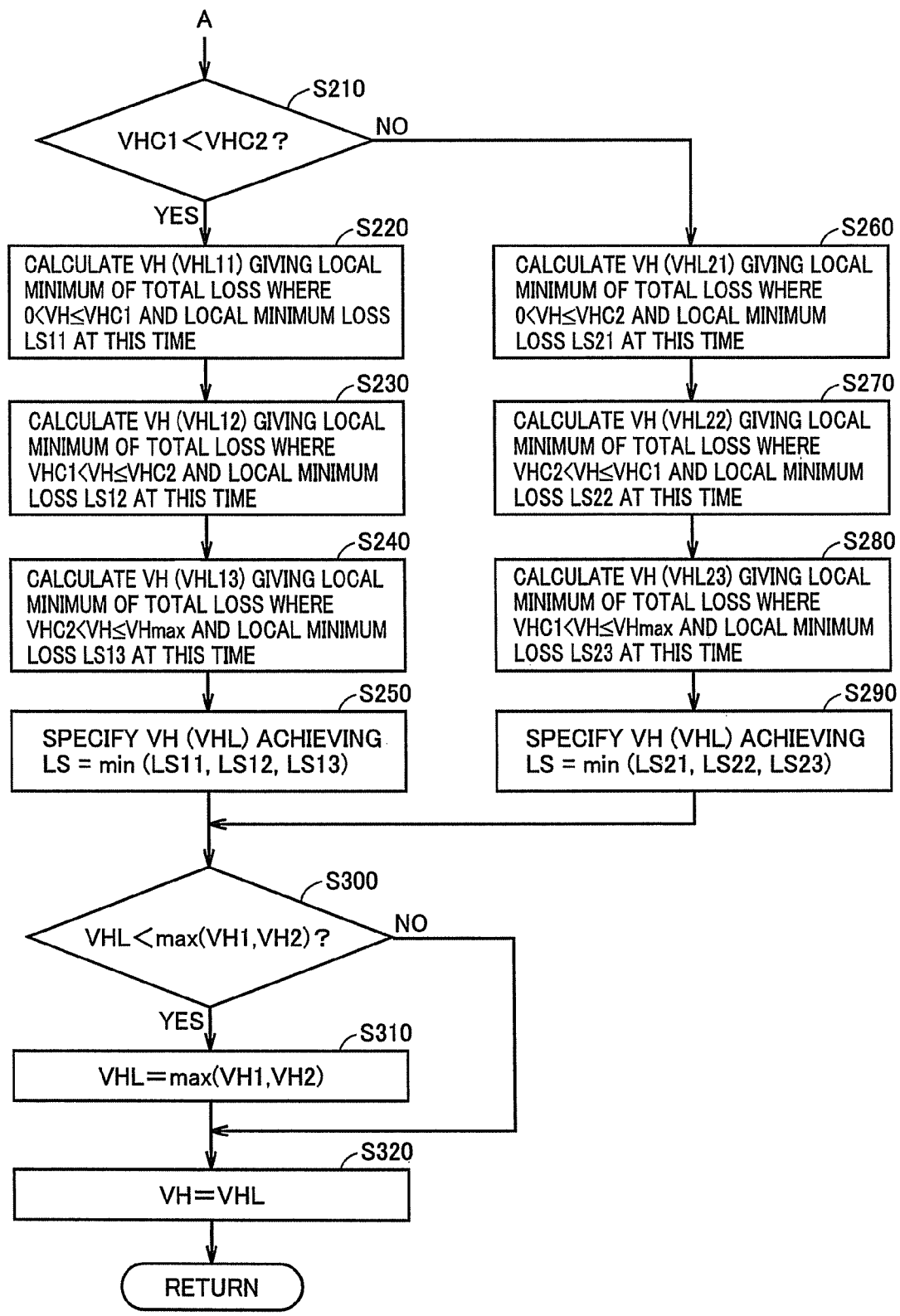
FIG. 19 shows a second flowchart for illustrating the procedure of the process of setting a system voltage that is executed by the ECU in the third embodiment.

FIGS. 18 and 19 show a flowchart for illustrating a procedure of a process of setting system voltage VH executed by ECU 40 in the third embodiment. Referring to FIG. 18, ECU 40 acquires torque command value TR1 and rotational speed N1 of motor generator MG1 (step S110). Then, ECU 40 refers to map MAP(VHC1) shown in FIG. 15 to specify switch voltage VHC1 for the operating point of motor generator MG1 that is acquired in step S110 (step S120).

Further, ECU 40 specifies loss functions f11(VH) and f12(VH) of motor generator MG1 and inverter 20 for the operating point of motor generator MG1 that is acquired in step S110 (step S130). More specifically, ECU 40 refers to maps MAP(a11), MAP(b11), and MAP(c11) shown in FIG. 15 to specify quadratic term coefficient a11, linear term coefficient b11, and constant term c11 of loss function f11 (VH) for the operating point of motor generator MG1 that is acquired in step S110. ECU 40 also refers to MAP(b12) and MAP(c12) shown in FIG. 15 to specify linear term coefficient b12 and constant term c12 of loss function f12(VH) for the operating point of motor generator MG1 that is acquired in step S110. Further, ECU 40 refers to map MAP (VH1) shown in FIG. 15 to specify lower limit voltage VH1 corresponding to the operating point of motor generator MG1 that is acquired in step S110 (step S140).

For motor generator MG2 as well, ECU 40 acquires torque command value TR2 and rotational speed N2 of motor generator MG2 (step S150). Then, ECU 40 refers to map MAP (VHC2) shown in FIG. 16 to specify switch voltage VHC2 for the operating point of motor generator MG2 that is acquired in step S150 (step S160).

Further, ECU 40 specifies loss functions f21(VH) and f22(VH) of motor generator MG2 and inverter 30 for the operating point of motor generator MG2 that is acquired in step S150 (step S170). More specifically, ECU 40 refers to maps MAP(a21), MAP(b21), and MAP(c21) shown in FIG. 16 to specify quadratic term coefficient a21, linear term coefficient b21, and constant term c21 of loss function f21(VH) for the operating point of motor generator MG2 that is acquired in step S150. ECU 40 also refers to MAP(b22) and MAP(c22) shown in FIG. 16 to specify linear term coefficient b22 and constant term c22 of loss function f22(VH) for the operating point of motor generator MG2 that is acquired in step S150. Further, ECU 40 refers to map MAP(VH2) shown in FIG. 16 to specify lower limit voltage VH2 corresponding to the operating point of motor generator MG2 that is acquired in step S150 (step S180).

Subsequently, ECU 40 acquires current IB detected by current sensor 54 (FIG. 1) (step S190). Then, ECU 40 specifies loss function f3(VH) of voltage boost converter 10 for the acquired current IB (step S200). More specifically, ECU 40 refers to map MAP(a3, b3, c3) shown in FIG. 17 to specify quadratic term coefficient a3, linear term coefficient b3, and constant term c3 of loss function f3(VH) for current IB acquired in step S190.

Referring to FIG. 19, ECU 40 determines whether or not switch voltage VHC1 specified in step S120 is lower than switch voltage VHC2 specified in step S160 (step S210). When it is determined that switch voltage VHC1 is lower than switch voltage VHC2 (YES in step S210), ECU 40 calculates voltage VHL11 representing system voltage VH that gives a local minimum of the loss of motor generators MG1, MG2 and inverters 20, 30 as well as voltage boost converter 10 as a whole in the case where system voltage VH is equal to or lower than switch voltage VHC1, and calculates local minimum loss LS11 at this time (step S220).

Specifically, ECU 40 adds loss function f21(VH) to loss function f11(VH) and further adds loss function f3(VH) thereto to thereby calculate function ft11(VH) which represents the loss of the whole system. Then, ECU 40 uses function ft11(VH) to calculate voltage VHL11 and local minimum loss LS11 using the following expressions.

$$VHL11=-(b11+b21+b3)/\{2\times(a11+a21+a3)\} \quad (10)$$

$$LS11=(a11+a21+a3)\times VHL11^2+(b11+b21+b3)\times VHL11+(c11+c21+c3) \quad (11)$$

Here, a11, b11, c11 are coefficients specified in step S130, a21, b21, c21 are coefficients specified in step S170, and a3, b3, c3 are coefficients specified in step S200. Expression (10) is obtained by setting the value of the derivative of function ft11(VH) to zero.

ECU 40 also calculates voltage VHL12 representing system voltage VH that gives a local minimum of the loss of the whole system in the case where system voltage VH is higher than switch voltage VHC1 and equal to or lower than switch voltage VHC2, and calculates local minimum loss LS12 at this time (step S230).

Specifically, ECU 40 adds loss function f21(VH) to loss function f12(VH) and further adds loss function f3(VH) thereto to thereby calculate function ft12(VH) representing the loss of the whole system. Then, ECU 40 uses function ft12(VH) to calculate voltage VHL12 and local minimum loss LS12 using the following expressions.

$$VHL12=-(b12+b21+b3)/\{2\times(a21+a3)\} \quad (12)$$

$$LS12=(a21+a3)\times VHL12^2+(b12+b21+b3)\times VHL12+(c12+c21+c3) \quad (13)$$

Here, b12, c12 are coefficients specified in step S130. Expression (12) is obtained by setting the value of the derivative of function ft12(VH) to zero.

Further, ECU 40 calculates voltage VHL13 representing system voltage VH that gives a local minimum of the loss of the whole system in the case where system voltage VH is higher than switch voltage VHC2 and equal to or less than maximum voltage VHmax, and calculates local minimum loss LS13 at this time (step S240).

Specifically, ECU 40 adds loss function f22(VH) to loss function f12(VH) and further adds loss function f3(VH) thereto to thereby calculate function ft13(VH) representing the loss of the whole system. Then, ECU 40 uses function ft13(VH) to calculate voltage VHL13 and local minimum loss LS13 using the following expressions.

$$VHL13=VHC2 \quad (14)$$

$$LS13=a3\times VHL13^2+(b12+b22+b3)\times VHL13+(c12+c22+c3) \quad (15)$$

Here, b22, c22 are coefficients specified in step S170.

Then, ECU 40 specifies, as voltage VHL, a system voltage that achieves a minimum one among local minimum losses LS11, LS12, LS13 calculated as described above (step S250). Specifically, when LS11 is minimum, it is specified as VHL=VHL11. When LS12 is minimum, it is specified as VHL=VHL12. When LS13 is minimum, it is specified as VHL=VHL13.

In contrast, when it is determined in step S210 that switch voltage VHC1 is equal to or higher than switch voltage VHC2 (NO in step S210), ECU 40 calculates voltage VHL21 representing system voltage VH that gives a local minimum of the loss of motor generators MG1, MG2 and inverters 20, 30 as well as voltage boost converter 10 as a whole, in the case where system voltage VH is equal to or lower than switch voltage VHC2, and calculates local minimum loss LS21 at this time (step S260). Here, respective ways to calculate voltage VHL21 and local minimum loss LS21 are the same as respective ways to calculate voltage VHL11 and local minimum loss LS11 in step S220, respectively.

ECU 40 also calculates voltage VHL22 representing system voltage VH that gives a local minimum of the loss of the whole system in the case where system voltage VH is higher than switch voltage VHC2 and equal to or less than switch voltage VHC1, and calculates local minimum loss LS22 at this time (step S270).

Specifically, ECU 40 adds loss function f22(VH) to loss function f11(VH) and further adds loss function f3(VH) thereto to thereby calculate function ft22(VH) representing the loss of the whole system. Then, ECU 40 uses function ft22(VH) to calculate voltage VHL22 and local minimum loss LS22 based on the following expressions.

$$VHL22 = -(b11+b22+b3)/\{2\times(a11+a3)\} \quad (16)$$

$$LS22 = (a11+a3)\times VHL22^2 + (b11+b22+b3)\times VHL22 + (c11+c22+c3) \quad (17)$$

Expression (16) is obtained by setting the value of the derivative of function ft22(VH) to zero.

Further, ECU 40 calculates voltage VHL23 representing system voltage VH that gives a local minimum of the loss of the whole system in the case where system voltage VH is higher than switch voltage VHC1 and equal to or less than maximum voltage VHmax, and calculates local minimum loss LS23 at this time (step S280). Respective ways to calculate voltage VHL23 and local minimum loss LS23 are the same as the ways to calculate voltage VHL13 and local minimum loss LS13 in step S240, respectively.

Then, ECU 40 specifies, as voltage VHL, the system voltage that achieves a minimum one among local minimum losses LS21, LS22, LS23 calculated as described above (step S290). Specifically, when LS21 is minimum, it is specified as VHL=VHL21. When LS22 is minimum, it is specified as VHL=VHL22. When LS23 is minimum, it is specified as VHL=VHL23.

After executing step S250 or step S290, ECU 40 proceeds to step S300. The processes executed in steps S300, S310, S320 are the same as those executed in steps S80, S90, and S100, respectively, shown in FIG. 10, and the description thereof will not be repeated.

As seen from the foregoing, in the third embodiment, the loss characteristic at the operating points for which the control mode is switched according to change of system voltage VH is approximated by means of functions that are different from each other depending on the region for which the rectangular-wave voltage control is selected and the region for which the PWM control mode is selected. Accordingly, the electric power loss is more accurately approximated and accordingly the precision with which system voltage VH is set based on the loss is enhanced. Thus, according to the third embodiment, the loss can be suppressed more reliably.

Fourth Embodiment

In this fourth embodiment, when the rotational speed of motor generators MG1, MG2 is low, non-boost control is executed under which switching element Q1 of the upper arm is made constantly ON (switching element Q2 of the lower arm is made constantly OFF) for the purpose of reducing the loss of voltage boost converter 10. When this non-boost control is performed, switching elements Q1, Q2 do not perform switching operation and thus no switching loss is generated. Therefore, when a switch is made between the non-boost control and the boost control, the loss characteristic of voltage boost converter 10 exhibits a stepwise change. Accordingly, in this fourth embodiment, the loss characteristic of voltage boost converter 10 is approximated by functions that are different from each other for the non-boost control and the boost control, respectively.

Figure 20:
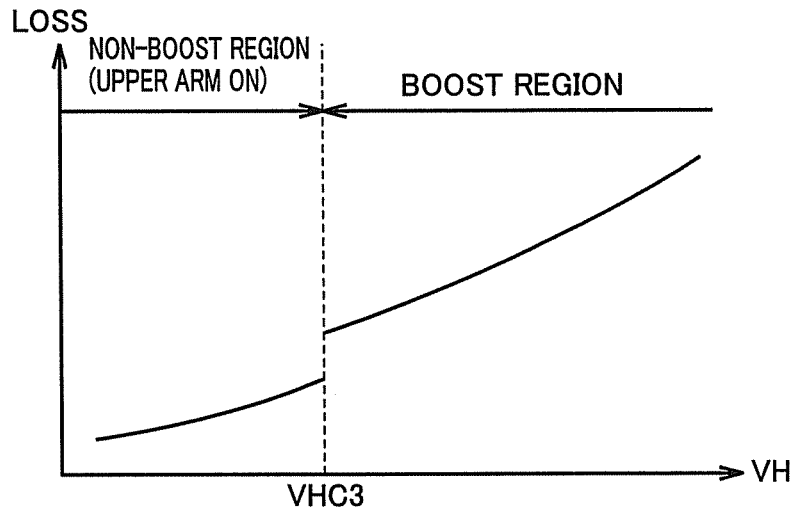
FIG. 20 is a diagram illustrating a tendency of a loss characteristic of the voltage boost converter in a fourth embodiment under the condition that the current of the power storage device is constant.

FIG. 20 is a diagram showing a tendency of the loss characteristic of voltage boost converter 10 in the fourth embodiment under the condition that current IB of power storage device B is constant. Referring to FIG. 20, when system voltage VH becomes lower than switch voltage VHC3 which is determined for each current IB, the non-boost control is performed. As described above, no switching loss is generated in voltage boost converter 10 in the non-boost region. Therefore, the loss characteristic exhibits a stepwise change at switch voltage VHC3. Then, in the fourth embodiment, the loss characteristic of voltage boost converter 10 is approximated by means of different functions for the non-boost region and the boost region, respectively. Specifically, for each value of current IB of power storage device B, the loss characteristic is approximated by the following function represented by a quadratic expression of system voltage VH.

$$VH < VHC3 : f31(VH) = a31\times VH^2 + b31\times VH + c31 \quad (18)$$

$$VH \geq VHC3 : f32(VH) = a32\times VH^2 + b32\times VH + c32 \quad (19)$$

Here, f31(VH) is a function representing the loss characteristic of voltage boost converter 10 when the non-boost control is performed, a31, b31, c31 are a quadratic term coefficient, a linear term coefficient, and a constant term, respectively of f31(VH). Further, f32(VH) is a function representing the loss characteristic of voltage boost converter 10 when the voltage boost control is performed, and a32, b32, and c32 are a quadratic term coefficient, a linear term coefficient, and a constant term, respectively, of f32(VH).

Figure 21:
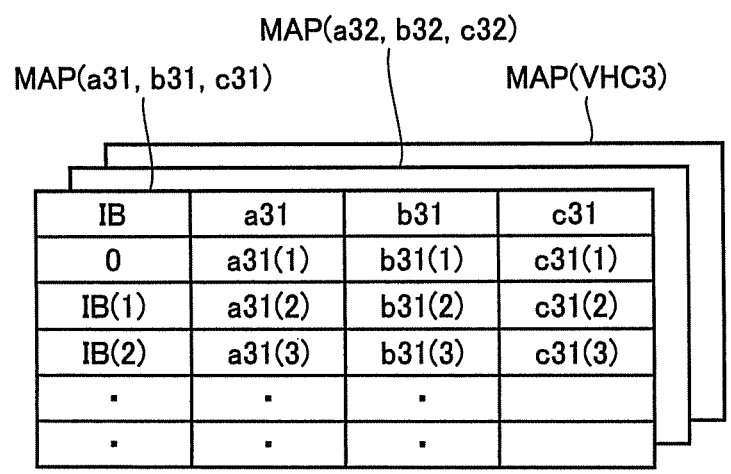
FIG. 21 is a diagram showing maps for the voltage boost converter in the fourth embodiment.

FIG. 21 is a diagram showing maps for voltage boost converter 10 in the fourth embodiment. Referring to FIG. 21, map MAP(a31, b31, c31) is a map of quadratic term coefficient a31, linear term coefficient b31, and constant term c31 shown in expression (18), and stores quadratic term coefficient a31, linear term coefficient b31, and constant term c31 of expression (18) for each current IB. Map MAP(a32, b32, c32) is a map of quadratic coefficient a32, linear term coefficient b32, and constant term c32 shown in expression (19), and stores quadratic term coefficient a32, linear term coefficient b32, and constant term c32 of expression (19) for each current IB. Map MAP(VHC3) is a map of switch voltage VHC3, and stores switch voltage VHC3 for each current IB.

Figure 22:
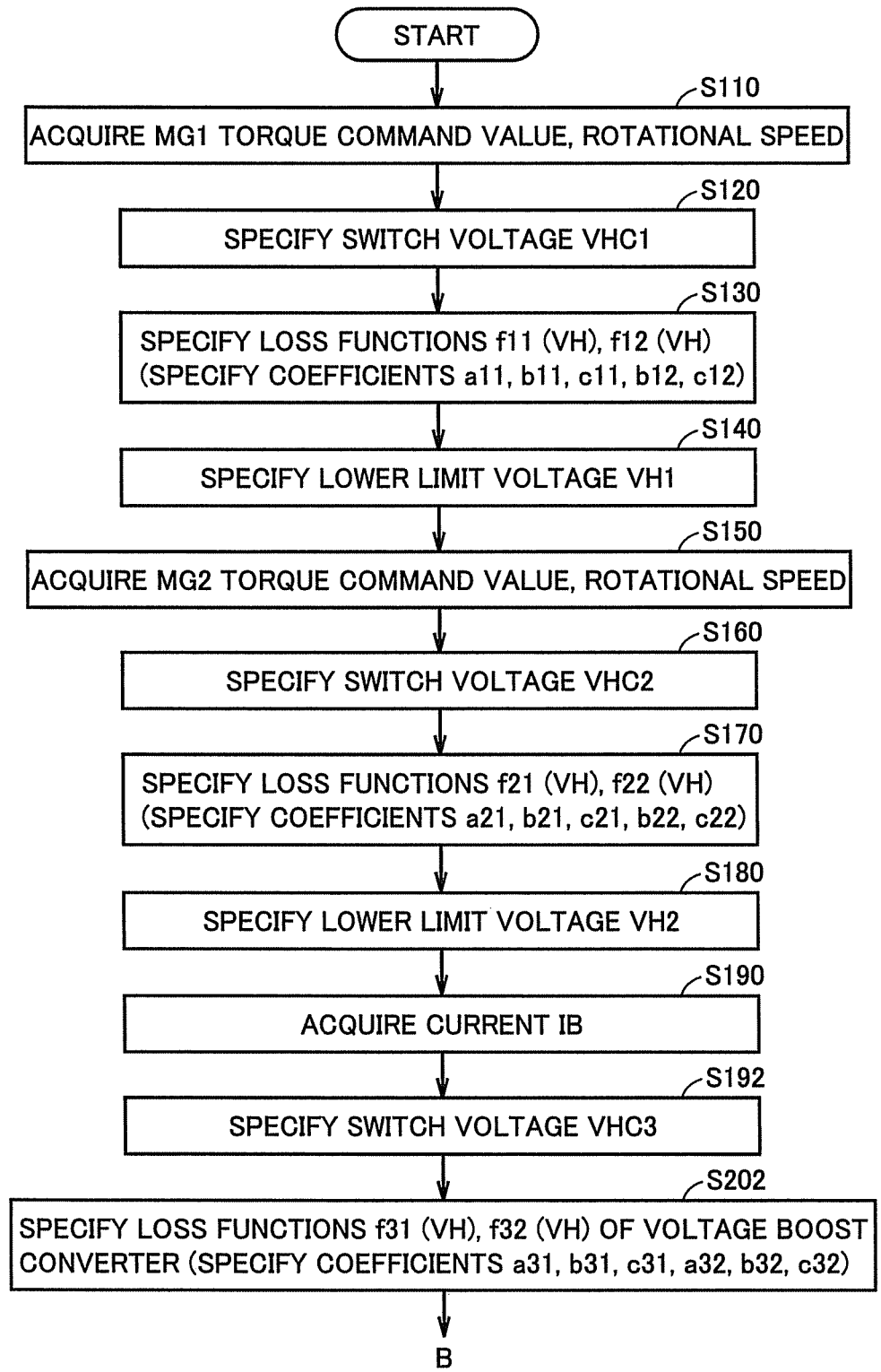
FIG. 22 shows a first flowchart for illustrating a procedure of a process of setting a system voltage that is executed by the ECU in the fourth embodiment.
Figures 23, 24:
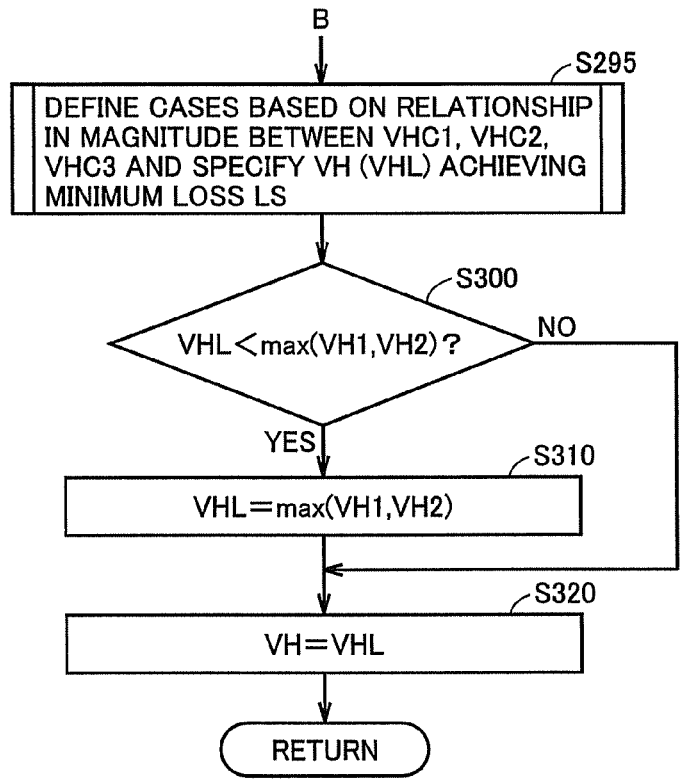
FIG. 23 shows a second flowchart for illustrating the procedure of the process of setting a system voltage that is executed by the ECU in the fourth embodiment.
FIG. 24 is a diagram showing a superordinate map for specifying a map to be used for setting a system voltage.

FIGS. 22 and 23 show a flowchart for illustrating a procedure of a process of setting system voltage VH that is executed by ECU 40 in the fourth embodiment. Referring to FIGS. 22 and 23, this flowchart is similar to the flowchart shown in FIGS. 18 and 19 except that the former further includes step S192, includes step S202 instead of step S200, and includes step S295 instead of steps S210 to S290.

Specifically, when current IB detected by current sensor 54 (FIG. 1) is acquired in step S190, ECU 40 refers to map MAP(VHC3) shown in FIG. 21 to specify switch voltage VHC3 for current IB acquired in step S190 (step S192). Then, ECU 40 specifies loss functions f31(VH), f32(VH) of voltage boost converter 10 for the acquired current IB (step S202). More specifically, ECU 40 refers to map MAP(a31, b31, c31) shown in FIG. 21 to specify quadratic term coefficient a31, linear term coefficient b31, and constant term c31 of loss function f31(VH) for current IB acquired in step S190. ECU 40 also refers to map MAP(a32, b32, c32) shown in FIG. 32 to specify quadratic term coefficient a32, linear term coefficient b32, and constant term c32 of loss function f32(VH) for current IB acquired in step S190.

Referring to FIG. 23, ECU 40 defines cases based on the relationship in terms of magnitude between switch voltages VHC1, VHC2, and VHC3 specified respectively in steps S120, S160, and S192 (FIG. 22), and calculates a local minimum of the loss of motor generators MG1, MG2 and inverters 20, 30 as well as voltage boost converter 10 as a whole, for each case. Then, ECU 40 specifies, as voltage VHL, a system voltage that achieves a minimum one among the calculated local minimums (step S295). After this, ECU 40 proceeds to step S300.

While it has been described above that the loss characteristic of voltage boost converter 10 is approximated by the quadratic function of system voltage VH, the loss characteristic of voltage boost converter 10 may also be approximated by a linear function of system voltage VH, as set forth above in connection with the second embodiment.

As seen from the foregoing, the non-boost control of voltage boost converter 10 can be executed in this fourth embodiment. As to the loss characteristic of voltage boost converter 10, the loss characteristic is approximated by means of different functions for the voltage boost region and the non-boost region, respectively. Accordingly, the loss of voltage boost converter 10 is more accurately approximated. As a result, precision with which system voltage VH is set based on the loss is enhanced. Therefore, the fourth embodiment can also more reliably suppress the loss.

Fifth Embodiment

According to the above embodiments each, the electric power loss is approximated by a function and this function is used to calculate system voltage VH. Therefore, the number of maps used for setting system voltage VH can be reduced. In contrast, this fifth embodiment provides a method according to which values which are set as system voltage VH are all held in a map without approximation of the power loss by a function, supposing that the ECU has adequate memory resources.

In the fifth embodiment, in association with certain operating points of motor generator MG1, maps are generated each storing values which are set as system voltage VH for respective operating points of motor generator MG2, and such maps are given for respective operating points of motor generator MG1. Namely, the number of maps corresponds to the number of operating points of motor generator MG1 (or MG2).

Figure 25:
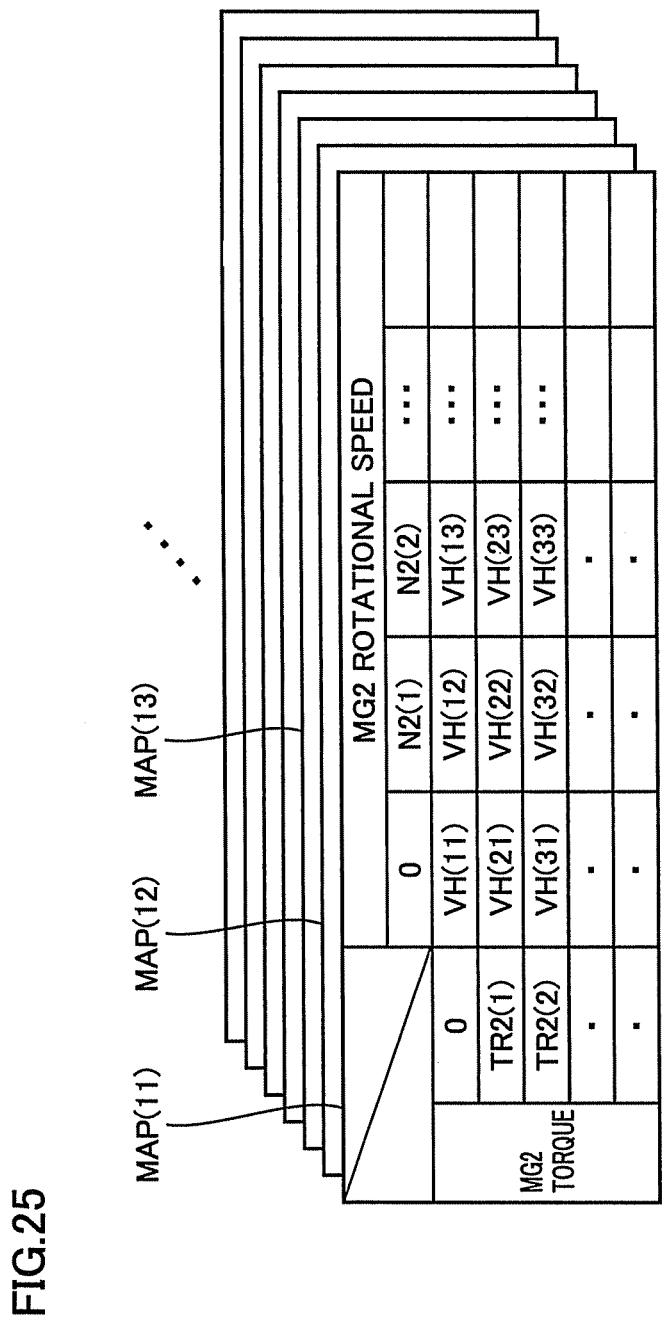
FIG. 25 is a diagram showing each map specified by the superordinate map shown in FIG. 24.

FIGS. 24 and 25 are each a diagram for illustrating a map configuration in the fifth embodiment. FIG. 24 is a diagram showing a superordinate map for specifying a map to be used for setting system voltage VH. Referring to FIG. 24, this superordinate map stores information about a map to be used for setting system voltage VH for each operating point (torque and rotational speed) of motor generator MG1.

FIG. 25 is a diagram showing maps each specified by the superordinate map shown in FIG. 24. Referring to FIG. 25, each map stores values that are set as system voltage VH for respective operating points of motor generator MG2, for a corresponding operating point of motor generator MG1. Namely, the number of a plurality of maps shown in FIG. 25 correspond to the number of operating points of motor generator MG1, and each map stores target values of system voltage VH for respective operating points of motor generator MG2.

Figure 26:
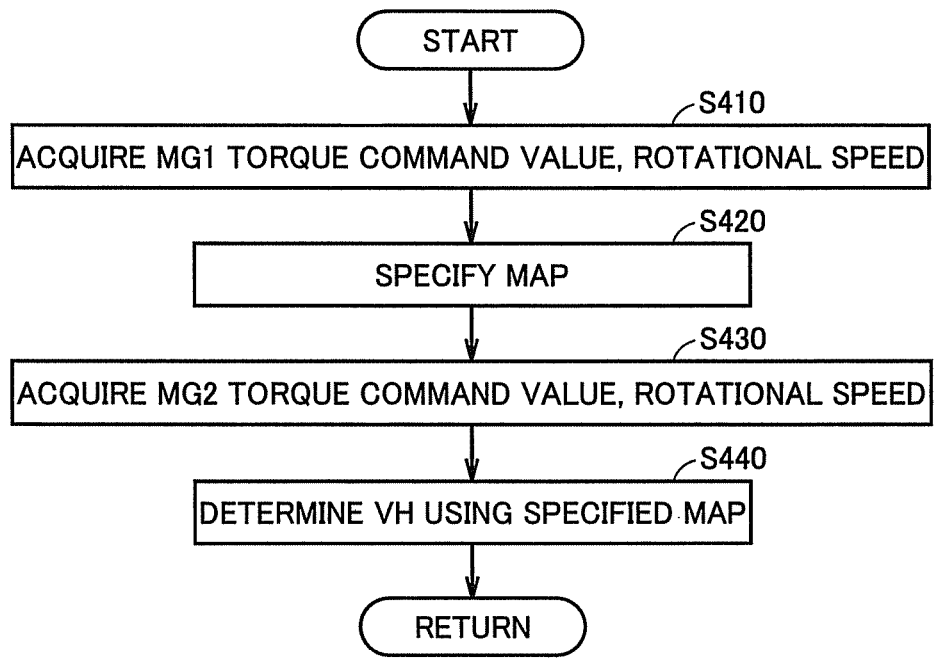
FIG. 26 shows a flowchart for illustrating a procedure of a process of setting a system voltage that is executed by the ECU in a fifth embodiment.

FIG. 26 is a flowchart for illustrating a procedure of a process of setting system voltage VH that is executed by ECU 40 in the fifth embodiment. Referring to FIG. 26, ECU 40 acquires torque command value TR1 and rotational speed N1 of motor generator MG1 (step S410). Then, ECU 40 refers to the map shown in FIG. 24 to specify a map corresponding to the operating point of motor generator MG1 that is acquired in step S410 (step S420).

Subsequently, ECU 40 acquires torque command value TR2 and rotational speed N2 of motor generator MG2 (step S430). Then, ECU 40 refers to the map specified in step S420 to specify a target value of system voltage VH that corresponds to the operating point of motor generator MG2 that is acquired in step S430 (step S440).

It should be noted that, in association with certain operating points of motor generator MG2, maps may be generated each storing values which are set as system voltage VH for respective operating points of motor generator MG1, and such maps may be given for respective operating points of motor generator MG2, which, however, is not particularly shown in drawings.

As seen from the foregoing, the fifth embodiment can also minimize the loss of the whole system.

It should be noted that according to the description of the above embodiments each, hybrid vehicle 100 includes two motor generators MG1, MG2 and the loss of the system including them is intended to be minimized. The present invention, however, is also applicable to a vehicle having only one motor generator as well as a vehicle including an additional motor generator. Namely, the loss characteristic of each device of the vehicle may be approximated by a quadratic expression or a linear expression of the system voltage to thereby enable a similar concept to the above-described one to be used for minimizing the loss of the whole system.

It should also be noted that motor generators MG1, MG2 in the foregoing correspond to an embodiment of "at least one motor" of the present invention, and inverters 20, 30 in the foregoing correspond to an embodiment of "drive unit" of the present invention. Moreover, voltage boost converter 10 corresponds to one embodiment of "voltage boost circuit" of the present invention, and ECU 40 corresponds to an embodiment of "control unit" of the present invention.

It should be construed that the embodiments disclosed herein are by way of illustration in all respects, not by way of limitation. It is intended that the scope of the present invention is defined by claims, not by the description above, and encompasses all modifications and variations equivalent in meaning and scope to the claims.

REFERENCE SIGNS LIST 2 engine; 3 power split device; 4 drive wheel; 10 voltage boost converter; 20, 30 inverter; 40 ECU; 52, 56 voltage sensor; 54 current sensor; 58, 60 rotational position sensor; 70, 76 PWM control unit; 72, 78 rectangular-wave voltage control unit; 74, 80 control mode switch unit; 82 system voltage setting unit; 84 converter control unit; 100 hybrid vehicle; B power storage device; SMR system main relay; PL1, PL2 positive line; NL negative line; C capacitor; Q1, Q2 switching element; D1, D2 diode; L reactor; MG1, MG2 motor generator

The invention claimed is:

1. A motor drive apparatus driving at least one motor, comprising:
a drive unit driving said at least one motor, said drive unit selectively making a switch between a PWM control mode in which a pulse-width-modulated voltage is applied to said at least one motor, and a rectangular-wave voltage control mode in which a phase-controlled rectangular-wave voltage is applied to said at least one motor;
a voltage boost circuit provided between a DC power supply and said drive unit and performing a voltage boost so that a system voltage representing a voltage for said drive unit is equal to or higher than a voltage of said DC power supply; and
a control device controlling said voltage boost circuit, said control device setting a target value of said system voltage based on an electric power loss of said drive unit and said at least one motor,
said control device calculating said target value of said system voltage using a function expression generated, for each operating point of said at least one motor, by approximating a loss characteristic which represents change of said electric power loss with respect to change of said system voltage, by a quadratic expression or a linear expression of said system voltage, wherein
said at least one motor includes first and second motors,
said drive unit includes first and second drive circuits driving said first and second motors, respectively, and
said control device calculates said target value of said system voltage using a third function expression generated by adding a second function expression to a first function expression, wherein said first function expression is generated, for each operating point of said first motor, by approximating a loss characteristic of said first motor and said first drive circuit with respect to change of said system voltage, by a quadratic expression or a linear expression of said system voltage, and said second function expression is generated, for each operating point of said second motor, by approximating a loss characteristic of said second motor and said second drive circuit with respect to change of said system voltage, by a quadratic expression or a linear expression of said system voltage.

2. The motor drive apparatus according to claim 1, wherein for an operating point for which said PWM control mode and said rectangular-wave voltage control mode are selectively switched to each other according to change of said system voltage, said control device calculates said target value of said system voltage using two different function expressions generated by approximating said loss characteristic for being applied respectively to a region for which said PWM control mode is selected and a region for which said rectangular-wave voltage control mode is selected.

3. A vehicle comprising a motor drive apparatus as recited in claim 2.

4. A vehicle comprising a motor drive apparatus as recited in claim 1.

5. A motor drive apparatus driving at least one motor, comprising:
a drive unit driving said at least one motor, said drive unit selectively making a switch between a PWM control mode in which a pulse-width-modulated voltage is applied to said at least one motor, and a rectangular-wave voltage control mode in which a phase-controlled rectangular-wave voltage is applied to said at least one motor;
a voltage boost circuit provided between a DC power supply and said drive unit and performing a voltage boost so that a system voltage representing a voltage for said drive unit is equal to or higher than a voltage of said DC power supply; and
a control device controlling said voltage boost circuit, said control device setting a target value of said system voltage based on an electric power loss of said drive unit and said at least one motor,
said control device calculating said target value of said system voltage using a function expression generated, for each operating point of said at least one motor, by approximating a loss characteristic which represents change of said electric power loss with respect to change of said system voltage, by a quadratic expression or a linear expression of said system voltage, wherein
said control device calculates said target value of said system voltage using a third function expression generated by adding a second function expression to a first function expression, said first function expression represents said function expression, and said second function expression is generated by approximating a loss characteristic of said voltage boost circuit with respect to change of said system voltage, by a quadratic expression or a linear expression of said system voltage.

6. The motor drive apparatus according to claim 5, wherein said second function expression includes fourth and fifth function expressions generated by approximating the loss characteristic of said voltage boost circuit for being applied respectively to a voltage boost region for which a voltage boost operation is performed by said voltage boost circuit and a non-voltage-boost region for which the voltage boost operation is not performed by said voltage boost circuit.

7. The motor drive apparatus according to claim 6, wherein for an operating point for which said PWM control mode and said rectangular-wave voltage control mode are selectively switched to each other according to change of said system voltage, said control device calculates said target value of said system voltage using two different function expressions generated by approximating said loss characteristic for being applied respectively to a region for which said PWM control mode is selected and a region for which said rectangular-wave voltage control mode is selected.

8. A vehicle comprising a motor drive apparatus as recited in claim 6.

9. The motor drive apparatus according to claim 5, wherein for an operating point for which said PWM control mode and said rectangular-wave voltage control mode are selectively switched to each other according to change of said system voltage, said control device calculates said target value of said system voltage using two different function expressions generated by approximating said loss characteristic for being applied respectively to a region for which said PWM control mode is selected and a region for which said rectangular-wave voltage control mode is selected.

10. A vehicle comprising a motor drive apparatus as recited in claim 5.

11. A method for controlling a motor drive apparatus driving at least one motor,
said motor drive apparatus including:
a drive unit driving said at least one motor, said drive unit selectively making a switch between a PWM control mode in which a pulse-width-modulated voltage is applied to said at least one motor, and a rectangular-wave voltage control mode in which a phase-controlled rectangular-wave voltage is applied to said at least one motor; and a voltage boost circuit provided between a DC power supply and said drive unit and performing a voltage boost so that a system voltage representing a voltage for said drive unit is equal to or higher than a voltage of said DC power supply, and said method comprising the steps of:

setting a target value of said system voltage based on an electric power loss of said drive unit and said at least one motor; and controlling said voltage boost circuit based on said target value of said system voltage, said step of setting a target value including the step of calculating said target value of said system voltage using a function expression generated, for each operating point of said at least one motor, by approximating a loss characteristic which represents change of said electric power loss with respect to change of said system voltage, by a quadratic expression or a linear expression of said system voltage, wherein said at least one motor includes first and second motors said drive unit includes first and second drive circuits driving said first and second motors, respectively, and said step of calculating said target value includes the step of calculating said target value of said system voltage using a third function expression generated by adding a second function expression to a first function expression, wherein said first function expression is generated, for each operating point of said first motor, by approximating a loss characteristic of said first motor and said first drive circuit with respect to change of said system voltage, by a quadratic expression or a linear expression of said system voltage, and said second function expression is generated, for each operating point of said second motor, by approximating a loss characteristic of said second motor and said second drive circuit with respect to change of said system voltage, by a quadratic expression or a linear expression of said system voltage.

12. The method for controlling a motor drive apparatus according to claim 11, wherein said step of calculating said target value includes the step of calculating said target value of said system voltage using, for an operating point for which said PWM control mode and said rectangular-wave voltage control mode are selectively switched to each other according to change of said system voltage, two different function expressions generated by approximating said loss characteristic for being applied respectively to a region for which said PWM control mode is selected and a region for which said rectangular-wave voltage control mode is selected.

13. The method for controlling a motor drive apparatus driving at least one motor, said motor drive apparatus including:

a drive unit driving said at least one motor, said drive unit selectively making a switch between a PWM control mode in which a pulse-width-modulated voltage is applied to said at least one motor, and a rectangular-wave voltage control mode in which a phase-controlled rectangular-wave voltage is applied to said at least one motor; and a voltage boost circuit provided between a DC power supply and said drive unit and performing a voltage boost so that a system voltage representing a voltage for said drive unit is equal to or higher than a voltage of said DC power supply, and said method comprising the steps of:

setting a target value of said system voltage based on an electric power loss of said drive unit and said at least one motor; and controlling said voltage boost circuit based on said target value of said system voltage, said step of setting a target value including the step of calculating said target value of said system voltage using a function expression generated, for each operating point of said at least one motor, by approximating a loss characteristic which represents change of said electric power loss with respect to change of said system voltage, by a quadratic expression or a linear expression of said system, voltage, wherein said step of calculating said target value includes the step of calculating said target value of said system voltage using a third function expression generated by adding a second function expression to a first function expression, said first function expression represents said function expression, and said second function expression is generated by approximating a loss characteristic of said voltage boost circuit with respect to change of said system voltage, by a quadratic expression or a linear expression of said system voltage.

14. The method for controlling a motor drive apparatus according to claim 13, wherein, said second function expression includes fourth and fifth function expressions generated by approximating the loss characteristic of said voltage boost circuit for being applied respectively to a voltage boost region for which a voltage boost operation is performed by said voltage boost circuit and a non-voltage-boost region for which the voltage boost operation is not performed by said voltage boost circuit.

15. The method for controlling a motor drive apparatus according to claim 14, wherein said step of calculating said target value includes the step of calculating said target value of said system voltage using, for an operating point for which said PWM control mode and said rectangular-wave voltage control mode are selectively switched to each other according to change of said system voltage, two different function expressions generated by approximating said loss characteristic for being applied respectively to a region for which said PWM control mode is selected and a region for which said rectangular-wave voltage control mode is selected.

16. The method for controlling a motor drive apparatus according to claim 13, wherein said step of calculating said target value includes the step of calculating said target value of said system voltage using, for an operating point for which said PWM control mode and said rectangular-wave voltage control mode are selectively switched to each other according to change of said system voltage, two different function expressions generated by approximating said loss characteristic for being applied respectively to a region for which said PWM control mode is selected and a region for which said rectangular-wave voltage control mode is selected.

* * * * *